United States Patent [19]

Takemura et al.

[11] Patent Number: 5,049,295
[45] Date of Patent: Sep. 17, 1991

[54] AROMATIC POLYESTER, AROMATIC POLYESTER AMIDE, FILAMENTS THEREOF AND COMPOSITIONS THEREOF EACH CONTAINING AN INORGANIC FILLER OR MAGNETIC POWDER

[75] Inventors: Kazuya Takemura; Tadahiro Wakui; Kenji Yoshino, all of Chiba, Japan

[73] Assignee: Kawasaki Steel Corporation, Hyogo, Japan

[21] Appl. No.: 457,559

[22] Filed: Dec. 27, 1989

[30] Foreign Application Priority Data

Dec. 29, 1988 [JP] Japan .................. 63-334273

[51] Int. Cl.$^5$ .................................. C04B 35/04
[52] U.S. Cl. .................. 252/62.54; 528/176; 528/190; 528/193; 528/194; 428/216; 428/461; 428/460
[58] Field of Search ............ 252/62.54; 428/216, 428/461, 460; 528/190, 193, 194, 176

[56] References Cited

U.S. PATENT DOCUMENTS

| | | | |
|---|---|---|---|
| 4,457,962 | 7/1984 | Jaffe et al. | 428/36 |
| 4,540,737 | 9/1985 | Wissbrun et al. | 524/599 |
| 4,581,399 | 4/1986 | Yoon | 524/246 |
| 4,717,624 | 1/1988 | Ikenaga et al. | 428/423.1 |
| 4,719,250 | 1/1988 | Eickman et al. | 523/212 |
| 4,737,398 | 4/1988 | Ikenaga et al. | 428/216 |
| 4,746,694 | 5/1988 | Charbonneau et al. | 524/602 |
| 4,851,497 | 7/1989 | Wakui et al. | 528/176 |
| 4,863,767 | 9/1989 | Garg et al. | 428/1 |
| 4,900,804 | 2/1990 | Wakui et al. | 528/332 |
| 4,904,752 | 2/1990 | Kanoe et al. | 528/97 |
| 4,910,057 | 3/1990 | Ide et al. | 428/36.9 |

Primary Examiner—William R. Dixon, Jr.
Assistant Examiner—Alan Wright
Attorney, Agent, or Firm—Oliff & Berridge

[57] ABSTRACT

Provided herein are an aromatic polyester having superior physical properties which is composed of the following units

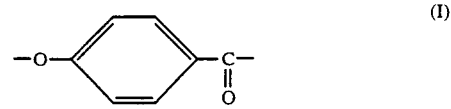 (I)

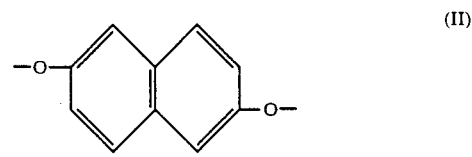

(II)

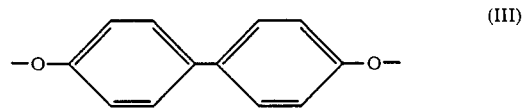

(III)

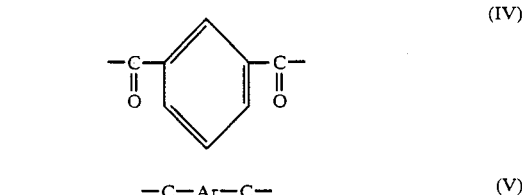

(IV)

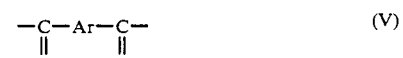

(V)

an aromatic polyester amide formed by introducing a prescribed amount of amide linkage into said aromatic polyester; filament thereof; and a composition formed by adding an inorganic filler or magnetic powder to said polymers.

8 Claims, 12 Drawing Sheets

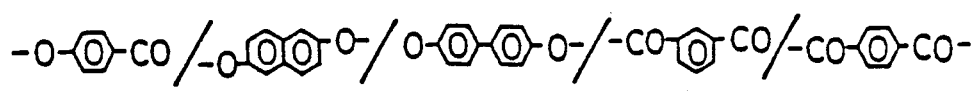
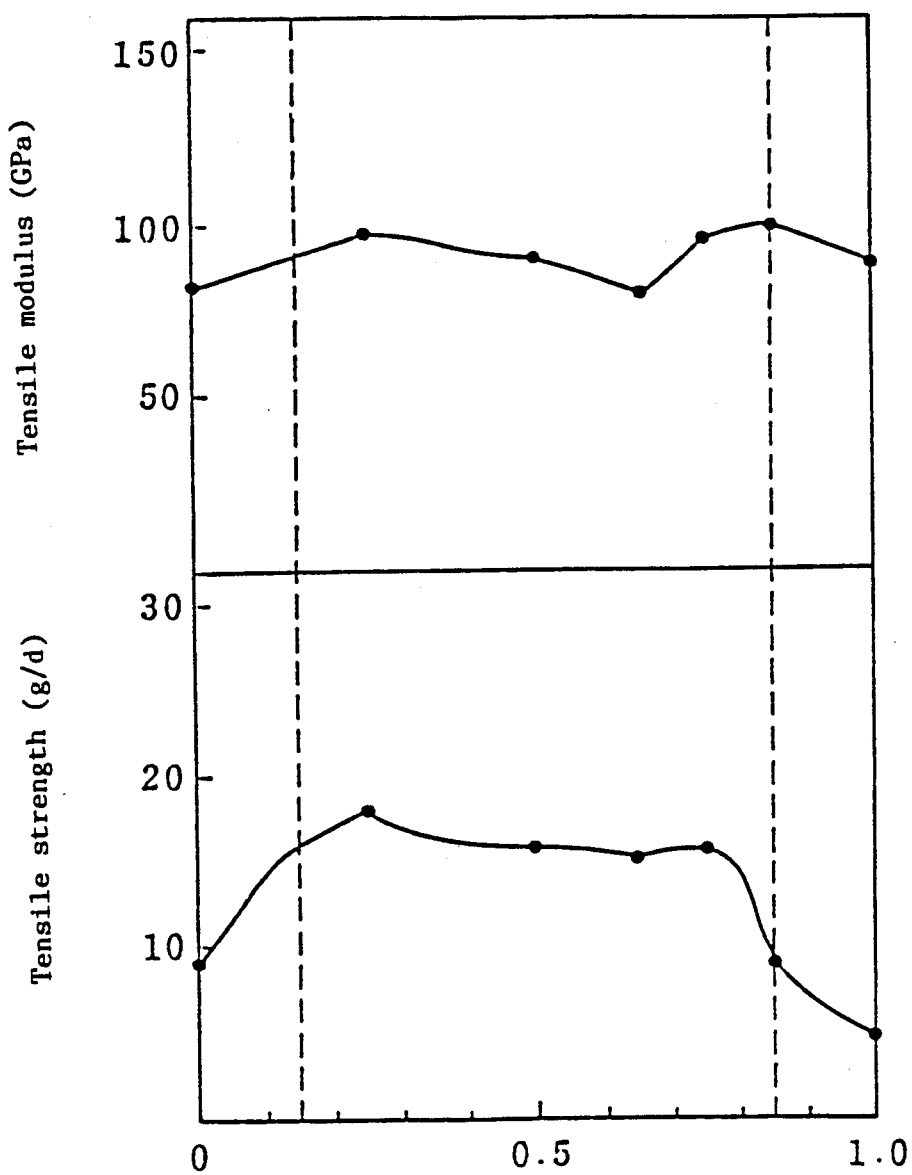
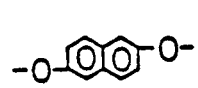   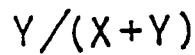   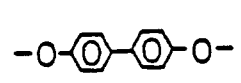
F I G. 4

AROMATIC POLYESTER, AROMATIC POLYESTER AMIDE, FILAMENTS THEREOF AND COMPOSITIONS THEREOF EACH CONTAINING AN INORGANIC FILLER OR MAGNETIC POWDER

BACKGROUND OF THE INVENTION

1. Field of the Invention

The present invention relates to a new aromatic polyester and aromatic polyester amide which has outstanding heat resistance, chemical resistance, dimensional stability, flame retardance, and mechanical strength, and is capable of injection molding, extrusion molding, blow molding, and spinning at a temperature lower than 340° C.

The present invention also relates to filaments of said aromatic polyester and aromatic polyester amide, said filaments having outstanding heat resistance, chemical resistance, dimensional stability, flame retardance, and mechanical strength.

The present invention further relates to compositions of said aromatic polyester and aromatic polyester amide, each containing an inorganic filler or magnetic powder, said compositions having outstanding heat resistance, chemical resistance, dimensional stability, flame retardance, and mechanical strength.

2. Description of the Prior Art

It is known that it is possible to produce a polyester which exhibits the melt anisotropy. A polymer of this kind is generally called thermotropic liquid crystalline polymer. It is also known that this liquid crystalline polymer provides, when spun or molded in its molten state, fibers or molded articles having high strength, high modulus, and high heat resistance. Of the liquid crystalline polymers, aromatic polyester are generally known, and homopolymers and copolymers of p-hydroxybenzoic acid are commercially available.

A disadvantage of these aromatic polyesters is that they have such a high melting point that they are incapable of spinning and melt molding and they have such a high melt viscosity that they need high temperatures for spinning and molding.

To overcome this disadvantage, investigations are being made to lower the melting point by copolymerizing p-hydroxybenzoic acid with another component. A copolymer component used for this purpose is one which has a flexible aliphatic chain or a flexing structure.

An example of the liquid crystalline polyester copolymerized with an aliphatic chain is disclosed in Japanese Patent Laid-open No. 84821/1983. This polyester is composed of p-hydroxybenzoic acid, polyethylene terephthalate, aromatic diol, and aromatic dicarboxylic acid. It has a melting point as low as 280°-300° C. and is superior in spinnability and moldability. It provides filaments having a high strength of 7-11 g/d after heat treatment.

The filaments of the polyester have a disadvantage that they have a tensile modulus as low as 400 g/d ($\approx$50.6 GPa) and are liable to form gel resulting from the thermal decomposition of aliphatic chains that takes place in the stage of spinning or synthesis, because the polymer contains aliphatic chains in the molecule. This gel causes filament breakage in the stage of spinning and poor appearance and lower strength of filaments obtained.

Another disadvantage of the aliphatic-containing liquid crystalline polymer is that it is by far lower in wet-heat stability than wholly aromatic liquid crystalline polyesters and that the molded article and fiber thereof greatly decrease in strength when placed in a hot, humid atmosphere.

On the other hand, an example of the polyester copolymerized with a flexible component is a wholly aromatic polyester containing 2,6-naphthalene diol, which is disclosed in Japanese Patent Laid-open No. 50594/1979 and U.S. Pat. No. 4,188,476. It is composed of p-hydroxybenzoic acid, terephthalic acid, and 2,6-naphthalene diol (according to said Japanese Patent), or it is composed of p-hydroxybenzoic acid, terephthalic acid, 2,6-naphthalene diol, and m-hydroxybenzoic acid (according to said U.S. Patent). It has a comparatively low melting point of 320°-350° C. owing to the flexible structure of 2,6-naphthalene diol. In addition, it has good moldability and provides filaments having a high strength of 15 g/d after heat treatment. Being a wholly aromatic polyester, it is not liable to form gel resulting from thermal decomposition and it is free of problems associated with filament breakage, poor appearance and strength decrease.

However, this polyester still has a disadvantage that it only provides filaments having a low tensile modulus of 500-600 g/d ($\approx$63.3-76.0 GPa) even after heat treatment. Therefore, it is not suitable for use in the area, such as fiber reinforced plastics, where high moduli are necessary.

Another example of the liquid crystalline polyester containing 6-hydroxy-2-naphthoic acid as the flexible component is disclosed in Japanese Patent Laid-open No. 62630/1984. It is composed of p-hydroxybenzoic acid, 6-hydroxy-2-naphthoic acid, 4,4'-dihydroxybiphenyl, and terephthalic acid. It provides filaments having a high tensile strength (about 23 g/d) and a high tensile modulus (about 1000 g/d=126.6 GPa). Being a wholly aromatic polyester, it is free of the gelation problem.

The above-mentioned wholly aromatic liquid crystalline polyesters involve several problems to be solved. That is, they need a molding temperature as high as 345°-370° C., which causes the thermal decomposition of resin in the spinning apparatus and molding machine, therefore a special molding or spinning apparatus which have the ability of molding or spinning continuouslly at high temperature is needed.

An example of the liquid crystalline polyester containing 2,6-naphthalene dicarboxylic acid is disclosed in Japanese Patent Laid-open No. 284221/1988 (U.S. Pat. No. 4,851,497). The liquid crystalline polyester has a disadvantage that it provides filament having a low modulus of 72 GPa even after heat treatment. Therefore, it can not provide improved high regid filament For reasons mentioned above, there has been a demand for a new liquid crystalline polyester having a high tensile modulus, high tensile strength, good moldability, good spinnability, and good wet-heat stability.

In the meantime, liquid crystalline polyester amide has been developed by introducing an amide linkage into a liquid crystalline polyester in order to improve the properties of liquid crystalline polyester, such as adhesion properties, fatigue resistance, and anisotropy (difference in physical properties observed in the direction of resin flow [MD] and the direction perpendicular to the direction of resin flow TD]). Examples of liquid crystalline polyester amide are disclosed in Japanese Patent Laid-open Nos. 137321/1982, 45123/1982, 172921/1982, 177019/1982, 177020/1982, 77021/1982, 29820/1983, 1722/1983, 89618/1983, 5103/1986, 36819/1986, 236826/1986, and 236827/1986.

These liquid crystalline polyester amides do not have the problems associated with anistropy which are common in the above-mentioned aromatic polyesters. Nevertheless, they still have disadvantages resulting from the introduction of amide groups. That is, they are poor in heat resistance and thermal stability (in other words, they decrease in mechanical strength when exposed to an environment at a high temperature for a long time). They are poor in weather resistance (in other words, they decrease in physical properties upon exposure to ultraviolet rays). They have a high melt viscosity (which leads to poor flowability and hence poor moldability). These drawbacks are more significant as the content of the amide component increases. In fact, the above-mentioned characteristic properties are considerably deteriorated when the content of amide linkage is high enough to relax the anisotropism sufficiently. Therefore, liquid crystalline polyester amide is of less practical use than liquid crystalline polyester.

It is known that liquid crystalline polyester and/or liquid crystalline polyester amide is incorporated with an inorganic filler for the improvement of heat resistance, scratch resistance, stiffness, and anisotropy, as disclosed in Japanese Patent Laid-open No. 38464/1989.

The incorporation of an inorganic filler improves the above-mentioned characteristic properties (i.e., heat resistance, scratch resistance, stiffness, and anisotropism). On the other hand, it poses problems associated with the decrease of impact strength and the deterioration of moldability (or flowability). The latter is particularly serious for the conventional wholly aromatic liquid crystalline polyester and/or wholly aromatic liquid crystalline polyester amide which needs a higher molding temperature than other resins. For this reason, there has been a demand for a wholly aromatic liquid crystalline polyester and/or wholly aromatic liquid crystalline polyester amide which contains an inorganic filler and yet exhibits good moldability.

In the meantime, a resin composition containing a magnetic powder is in general use, although inferior in magnetic properties to sintered magnets, owing to its advantage that it provides desired products, light in weight and complex in shape, by simple multi-cavity injection molding.

This resin composition is made with a binder resin such as epoxy resin and polyamide resin (e.g., nylon 6 and nylon 66). The binder resin determines the mechanical strength and heat resistance of the resin composition containing a magnetic powder. If the binder resin is epoxy resin or nylon, the heat distortion temperature of the resin composition will be 100°-120° C. or 140°-160° C., respectively.

The resin composition containing a magnetic powder should have high heat resistance so that it finds more uses. However, high heat resistance has so far been achieved at expense of moldability, and poor moldability offsets the advantage of being capable of complex molding and multicavity molding.

SUMMARY OF THE INVENTION

The present invention was completed to eliminate the above-mentioned disadvantages.

Accordingly, it is the first object of the present invention to provide an aromatic polyester which exhibits outstanding heat resistance, tensile modulus, tensile strength, spinnability, and moldability, and retains high strength and wet-heat stability even after molding.

It is the second object of the present invention to provide an aromatic polyester amide which exhibits outstanding anisotropy and mechanical properties (such as impact strength and flexural strength) without sacrificing the characteristic properties of the aforesaid aromatic polyester.

It is the third object of the present invention to provide filaments comprising the above described aromatic polyester and/or aromatic polyester amide, which exhibits outstanding heat resistance, mechanical strength and spinnability.

It is the fourth object of the present invention to provide an aromatic polyester and aromatic polyester amide each containing an inorganic filler which exhibits outstanding heat resistance, mechanical strength, and moldability owing to the inorganic filler.

It is the fifth object of the present invention to provide an aromatic polyester and aromatic polyester amide each containing a magnetic powder which exhibits outstanding magnetic properties, heat resistance, mechanical strength, and moldability.

The present invention provides, as its first embodiment, an aromatic polyester (aromatic liquid crystalline polyester) composed of the following units

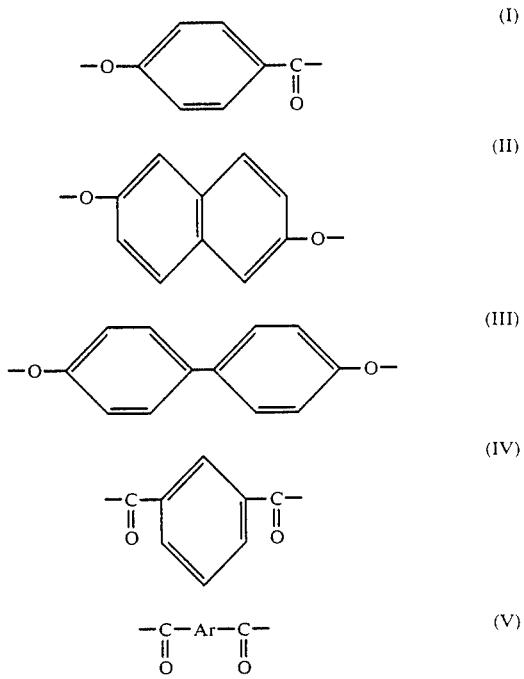

(where Ar denotes a p-phenylene group and/or 2,6-naphthalene group.)

characterized by that units (I) to (V) each has the aromatic ring or rings hydrogen atoms on which may be partly substituted by one or more members selected from $C_1$-$C_4$ alkyl groups, $C_1$-$C_4$ alkoxy groups, $C_6$-$C_{10}$ aryl groups, and halogen atoms; in the total number of moles of units (I) to (V), the amount of unit (I) accounts for 40-70 mol %, the amount of units (II) and (III) accounts for 15-30 mol %, the amount of units (IV) and (V) accounts for 15-30 mol %, the amount of unit (IV) accounts for 5-25 mol %, and the amount of 2,6-naphthalene group in unit (V) accounts for up to 5 mol %;

the molar ratio of [unit (II)+unit (III)] to [unit (IV)+unit (V)] is 1:0.9 to 1:1.1; the molar ratio of unit (III) to [unit (II)+unit (III)] is from 0.15 to 0.85; and the molar ratio of unit (V) to [unit (IV)+unit (V)] is from 0.10 to 0.90.

The present invention provides as its second embodiment, an aromatic polyester amide (aromatic liquid crystalline polyester amide) composed of the following units

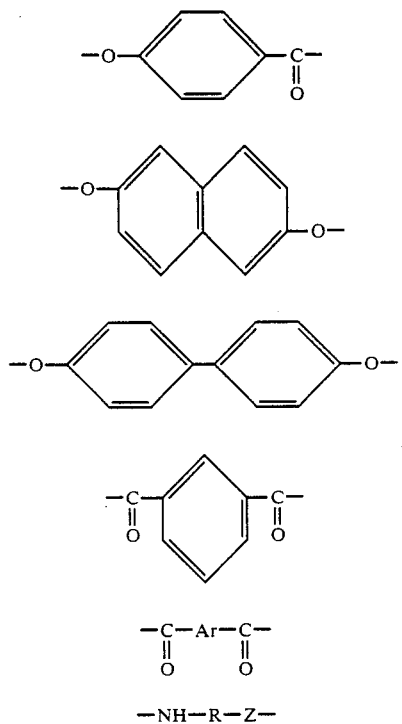

(I)

(II)

(III)

(IV)

(V)

—NH—R—Z— (VI)

(where Ar denotes a p-phenylene group and/or 2,6-naphthalene group; R denotes a p-phenylene group and/or m-phenylene group; and Z denotes —NH—, —O—, and/or

)

characterized by that units (I) to (VI) each has the aromatic ring or rings hydrogen atoms on which may be partly substituted by one or more members selected from $C_1$-$C_4$ alkyl groups, $C_1$-$C_4$ alkoxy groups, $C_6$-$C_{10}$ aryl groups, and halogen atoms; in the total number of moles of units (I) to (VI), the amount of unit (I) accounts for 40-70 mol %, the amount of units (II) and (III) accounts for 15-30 mol %, the amount of units (IV) and (V) accounts for 15-30 mol %, the amount of unit (IV) accounts for 5-25 mol %, and the amount of 2,6-naphthalene group in unit (V) accounts for up to 5 mol % and the amount of unit (VI) accounts for 0.1-10 mol %; when Z is —NH— and/or —O—, the molar ratio of [unit (II)+unit (III)+unit (VI)] to [unit (IV)+unit (V)] is 1:0.9 to 1:1.1; the molar ratio of unit (III) to [unit (II)+unit (III)+unit (VI)] is from 0.15 to 0.85; and the molar ratio of unit (V) to [unit (IV)+unit (V)] is from 0.10 to 0.90; and when Z is

the molar ratio of [unit (II)+unit (III)] to [unit (IV)+unit (V)] is 1:0.9 to 1:1.1; the molar ratio is from unit (III) to [unit (II)+unit (III)] is from 0.15 to 0.85; and the molar ratio of unit (V) to [unit (IV)+unit (V)] is from 0.10 to 0.90.

The present invention provides, as its third embodiment, an aromatic polyester filament comprising the aromatic polyester of the first embodiment of the present invention.

The present invention also provides, as its fourth embodiment, an aromatic polyester amide filament comprising the aromatic polyester amide of the second embodiment of the present invention.

The present invention provides, as its fifth embodiment, an inorganic filler-containing aromatic polyester composition (inorganic filler-containing aromatic liquid crystalline polyester composition), with the amount of inorganic filler being 1-400 parts by weight for 100 parts by weight of the aromatic polyester of the first embodiment of the present invention.

The present invention provides, as its sixth embodiment, an inorganic filler-containing aromatic polyester amide composition (inorganic filler-containing aromatic liquid crystalline polyester amide composition), with the amount of inorganic filler being 1-400 parts by weight for 100 parts by weight of the aromatic polyester amide of the second embodiment of the present invention.

The present invention provides, as its seventh embodiment, a magnetic powder-containing aromatic polyester composition (magnetic powder-containing aromatic liquid crystalline polyester composition), with the amount of magnetic powder being 100-1900 parts by weight for 100 parts by weight of the aromatic polyester of the first embodiment of the present invention.

The present invention provides, as its eighth embodiment, a magnetic powder-containing aromatic polyester amide composition (magnetic powder-containing aromatic liquid crystalline polyester amide composition), with the amount of magnetic powder being 100-1900 parts by weight for 100 parts by weight of the aromatic polyester amide of the second embodiment of the present invention.

BRIEF DESCRIPTION OF THE DRAWINGS

FIGS. 4 and 6 are graphs showing the dependence of the tensile modulus and tensile strength on the amount of units (II) and (III) in the first embodiment of the present invention.

DETAILED DESCRIPTION OF THE INVENTION

In the following, mention will be made of the aromatic polyester, which is the first embodiment of the present invention.

According to the first embodiment of the present invention, the unit (I) is represented by the formula below.

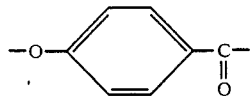

The amount of unit (I) should be 40-70 mol %, preferably 50-65 mol %, of the total amount of units (I) to (V). If the amount of unit (I) is less than 40 mol %, the resulting polyester is poor in heat resistance and provides fibers and molded articles having low strength. If the amount of unit (I) is more than 70 mol %, the resulting polyester has such a high melting point that it is difficult to synthesize and it is poor in spinnability and moldability. The reason why the amount of unit (I) is limited in the above-mentioned range is shown in FIGS. 1 and 2 and Comparative Example 9.

Figure 1:
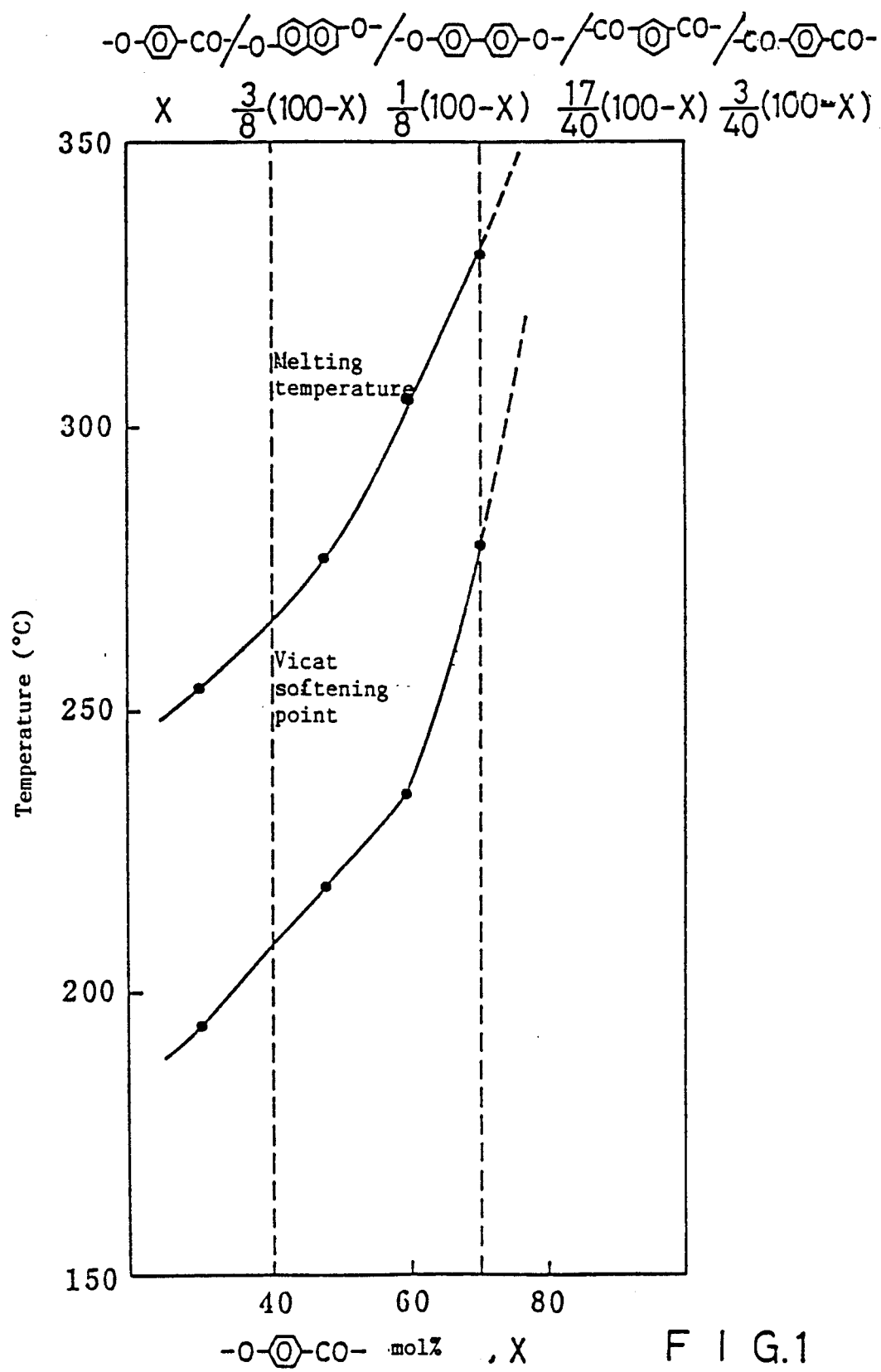
FIG. 1 is a graph showing the dependence of the melting point (moldability) and Vicat softening point (heat resistance) on the amount of unit (I) in the first embodiment of the present invention.
Figure 2:
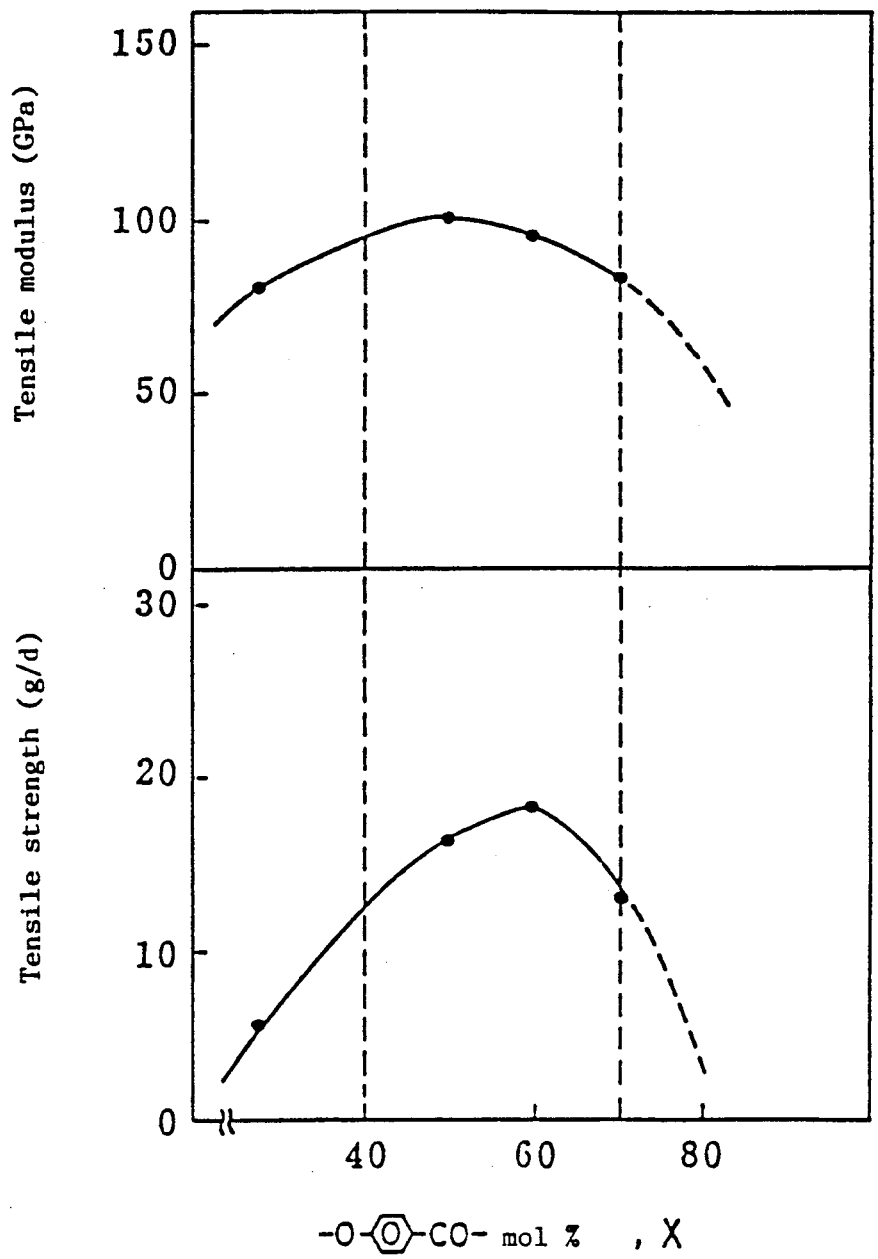
FIG. 2 is a graph showing the dependence of the tensile modulus and tensile strength on the amount of unit (I) in the first embodiment of the present invention.

To draw the graphs in FIGS. 1 and 2, copolymer polyesters composed of the following units were prepared, with the value of X varied,

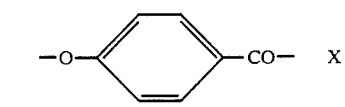

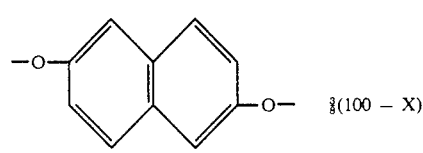

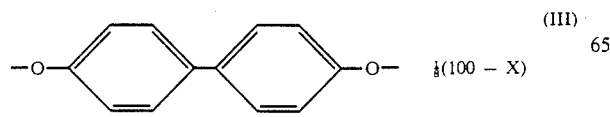

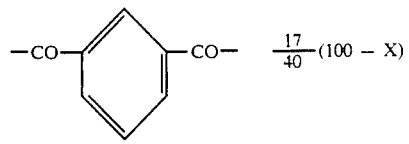

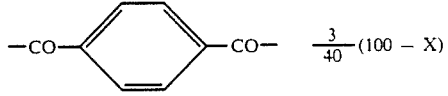

and the resulting polyesters were tested for melting point and Vicat softening point, and were also spun into filaments which were tested for tensile strength and tensile modulus after heat treatment. The measured data were plotted in FIGS. 1 and 2.

Units (II) and (III) are represented by the following formulas respectively.

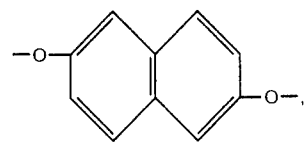

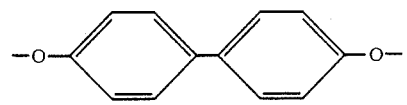

The total amount of units (II) and (III) should be 15-30 mol %, preferably 17-25 mol %, of the total amount of units (I) to (V). With a total amount less than 15 mol %, the resulting polyester has a high melting point and is poor in spinnability and moldability. With a total amount more than 30 mol %, the resulting polyester is poor in heat resistance and provides fibers and molded articles having low mechanical strength.

The amount of units (II) and (III) should be such that the molar ratio of unit (II) to [unit (II)+unit (III)] is in the range of from 0.15 to 0.85, preferably from 0.25 to 0.75. If the amounts of units (II) and (III) are outside the specified range, the resulting polyester has a high melting point and is poor in spinnability and moldability and provides filaments and molded articles having low mechanical strength. The reason why the amounts of units (II) and (III) are limited in the above-mentioned range is shown in FIGS. 3 to 6.

Figure 3:
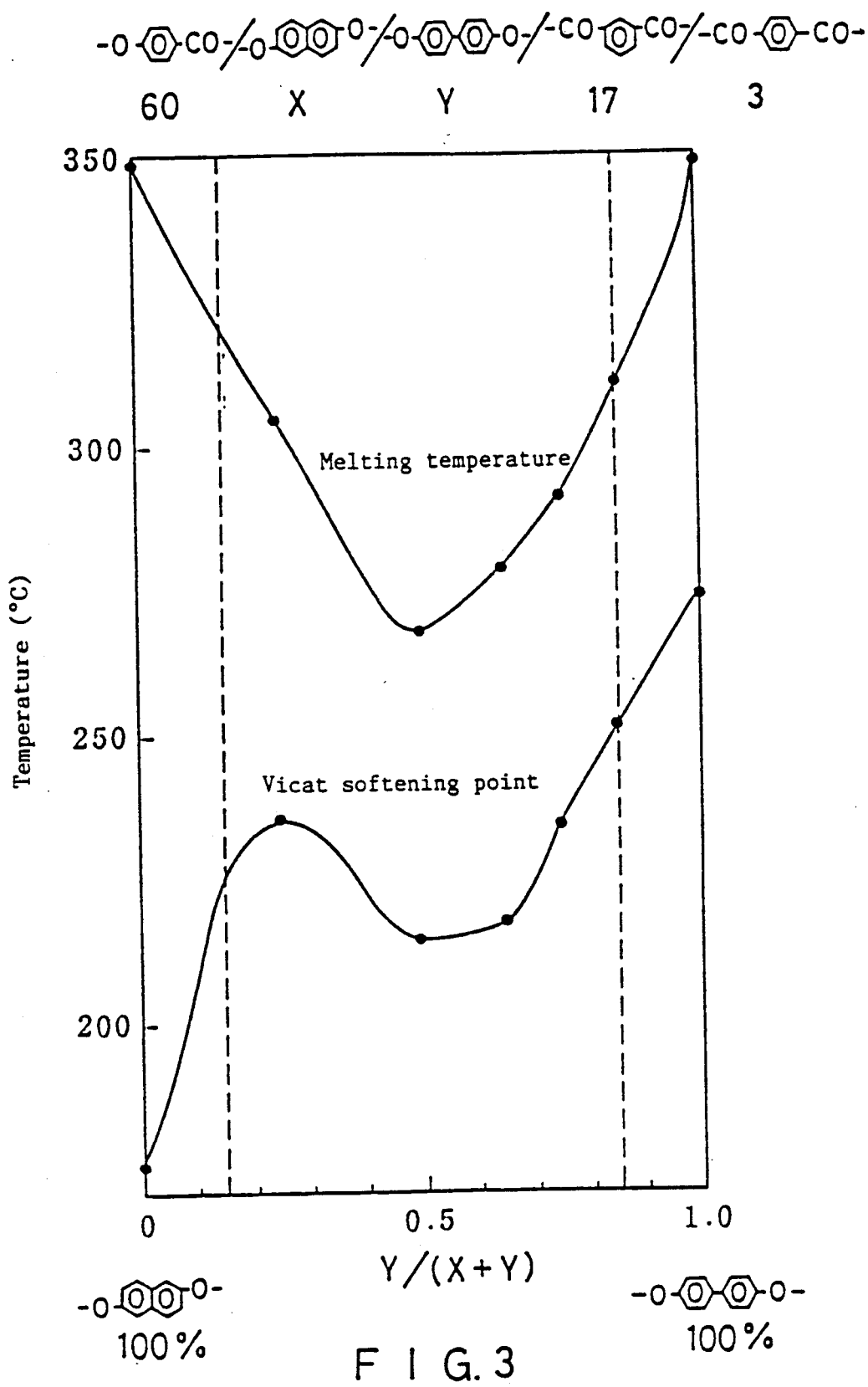
FIGS. 3 and 5 are graphs showing the dependence of the melting point and Vicat softening point on the amount of units (II) and (III) in the first embodiment of the present invention.

To draw the graphs in FIGS. 3 and 4, a copolymer polyesters composed of the following units were prepared, with the values of X and Y varied.

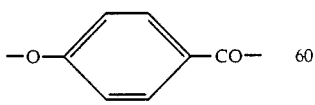

Figure 5:
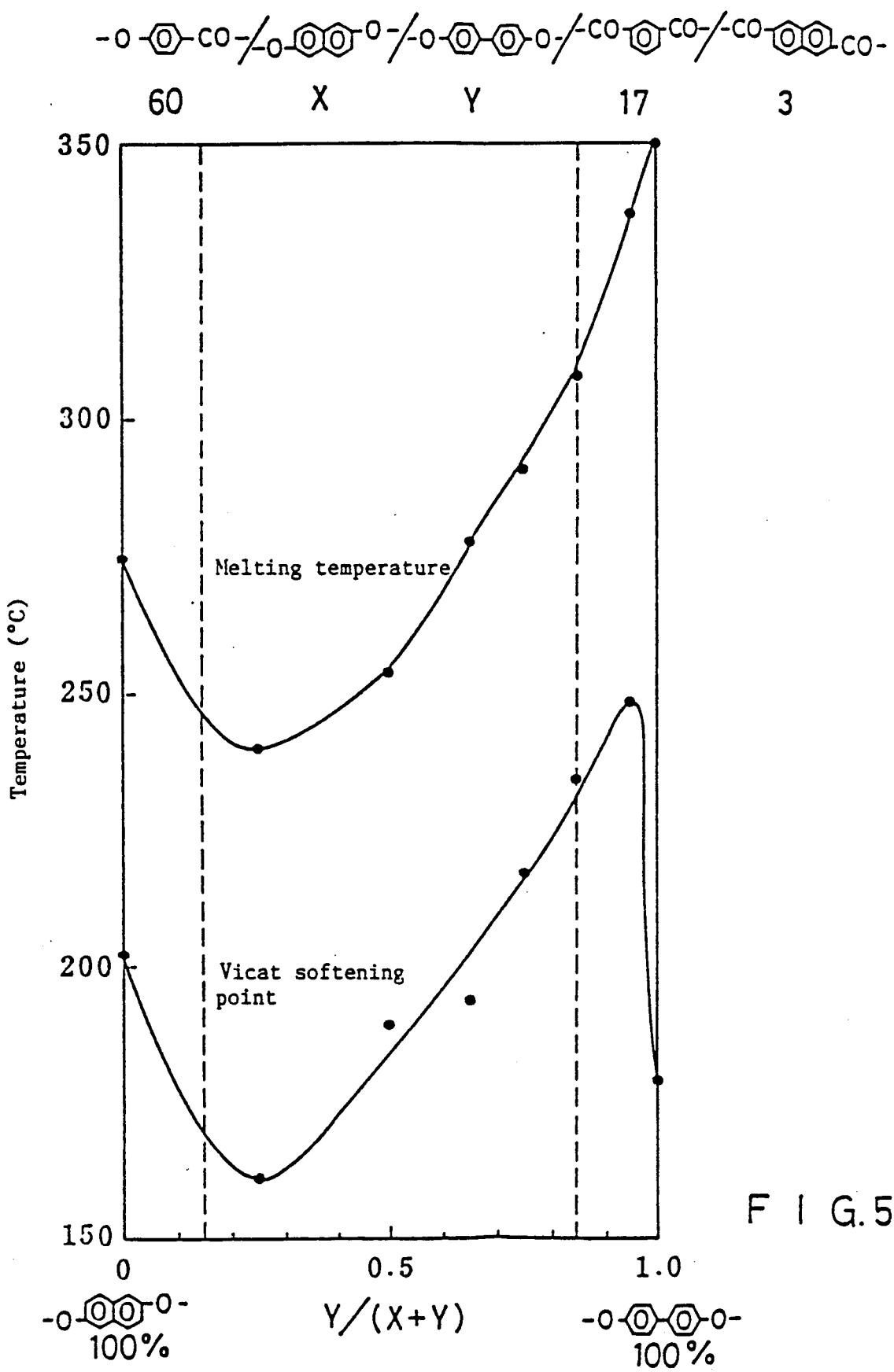
Figure 6:
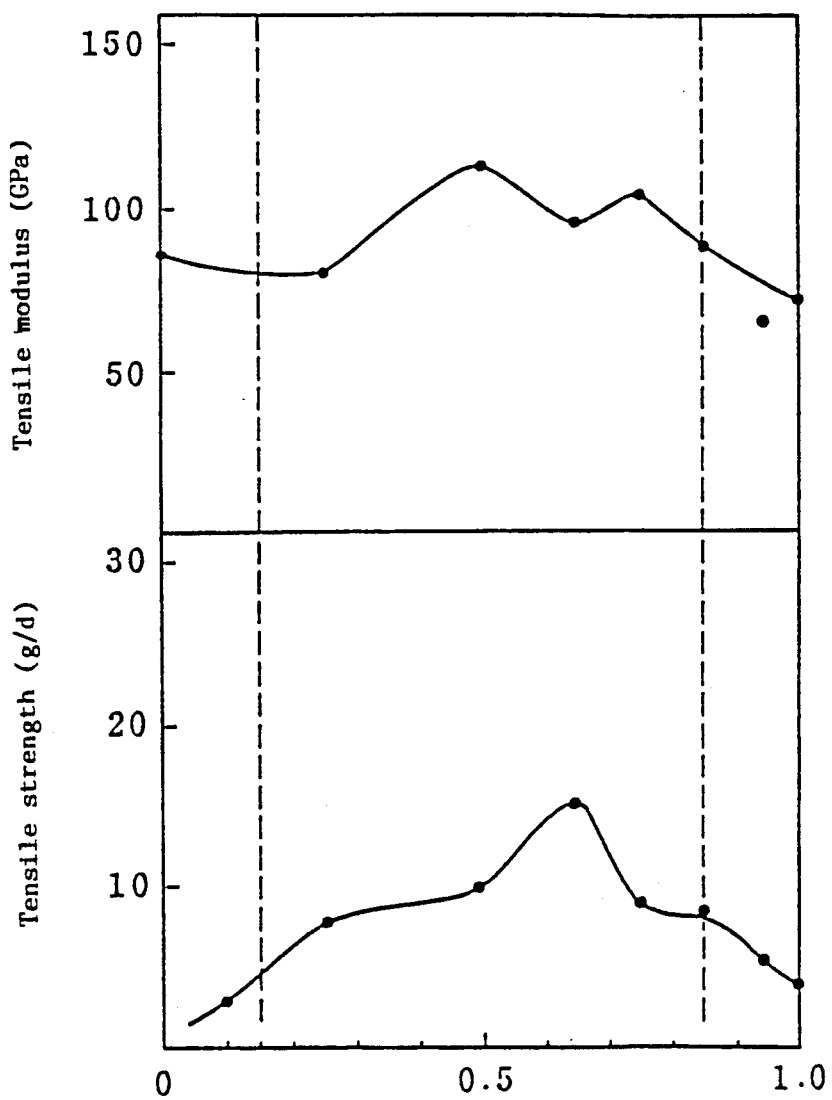

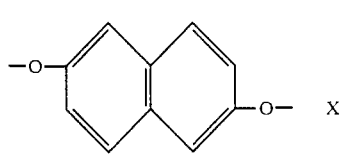

and to draw the graphs in FIGS. 5 and 6, copolymer polyesters composed of the following units were prepared, with the values of X and Y varied,

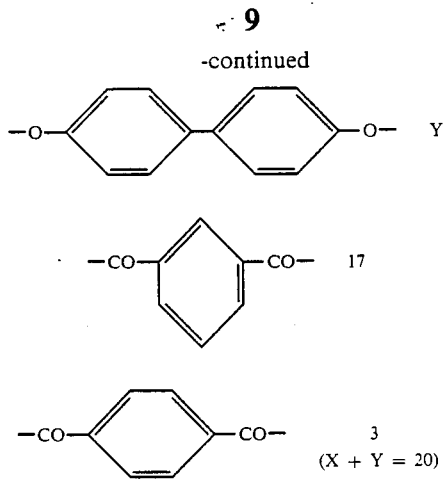

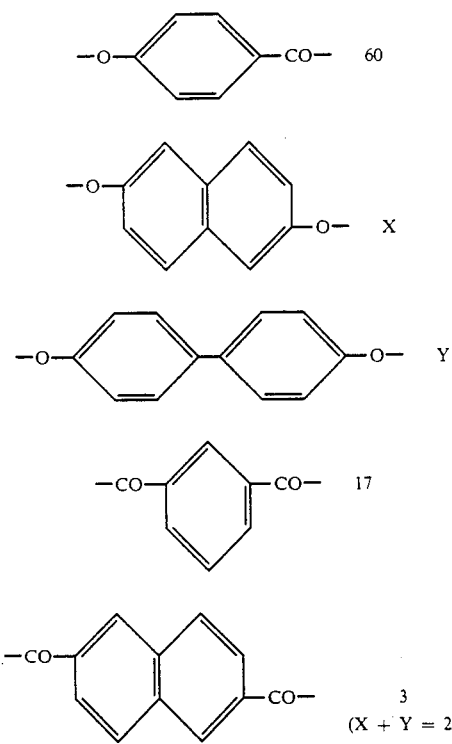

and the resulting polyesters were tested for melting point and Vicat softening point, and were also spun into filaments which were tested for tensile strength and tensile modulus after heat treatment. The measured data were plotted in FIGS. 3 to 6. Incidentally, it should be noted that unit (V) in FIGS. 3 and 4 is different from unit (V) in FIGS. 5 and 6.

Units (IV) and (V) are represented by the formulas below.

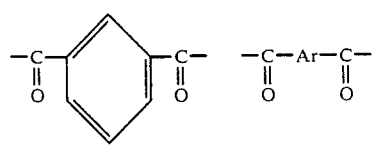

(where Ar denotes a p-phenylene group and/or 2,6-naphthalene group.)

The total amount of units (IV) and (V) should be 15–30 mol %, preferably 17–25 mol %, of the total amount of units (I) to (V). With a total amount less than 15 mol %, the resulting polyester has a high melting point and is poor in spinnability and moldability. With a total amount more than 30 mol %, the resulting polyester is poor in heat resistance and provides filaments and molded articles having low mechanical strength.

The amount of unit (IV) should be 5–25 mol %, preferably 10–20 mol %, of the total amount of units (I) to (V). With the amount of unit (IV) less than 5 mol %, the resulting polyester has a high melting point and is poor in spinnability, moldability and tensile modulous. With the amount of unit (IV) more than 25 mol %, the resulting polyester is poor in heat resistance.

The amount of 2,6-naphthalene group contained in unit (V) should be up to 5 mol %. When the amount of 2,6-naphthalene group in unit (V) is more than 5 mol %, the filament comprising the above mentioned aromatic polyester reveals remarkably low tensile strength and low tensile modulus.

The amounts of units (IV) and (V) should be such that the molar ratio of unit (V) to [unit (IV)+unit (V)] is from 0.10 to 0.90, preferably from 0.3 to 0.85. If the amounts of units (IV) and (V) are outside the specified range, the resulting polyester has a high melting point and is poor in spinnability and moldability and provides filaments having low tensile strength and tensile modulus. The reason why the amounts of units (IV) and (V) are limited in the abovementioned range is shown in FIGS. 7 and 8.

Figure 7:
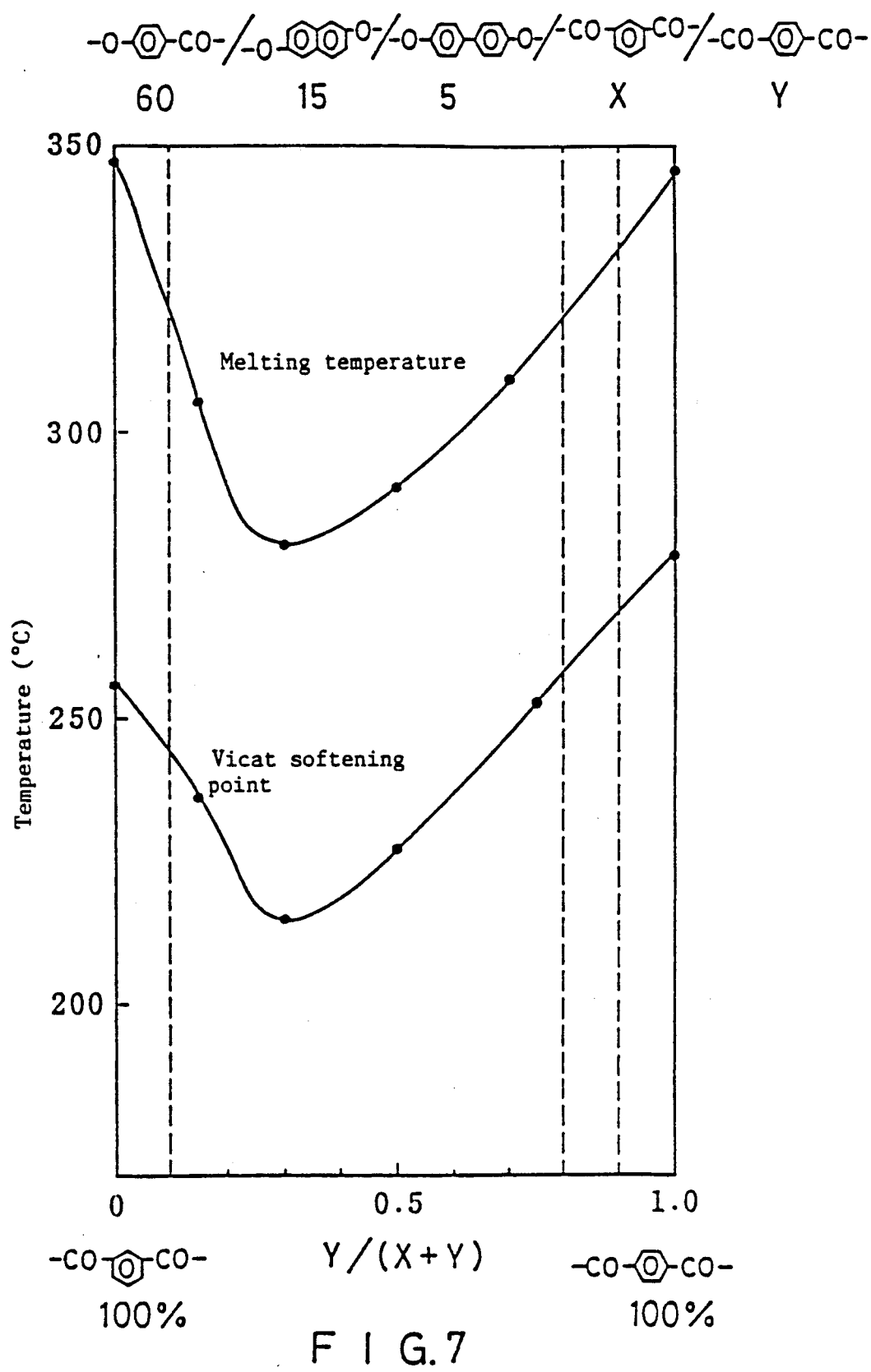
FIG. 7 is a graph showing the dependence of the melting point and Vicat softening point on the amount of units (IV) and (V) in the first embodiment of the present invention.
Figure 8:
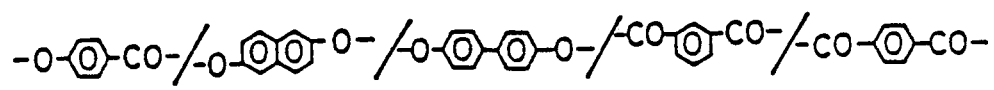
FIG. 8 is a graph showing the dependence of the tensile modulus and tensile strength on the amount of units (IV) and (V) in the first embodiment of the present invention.
Figure 8:
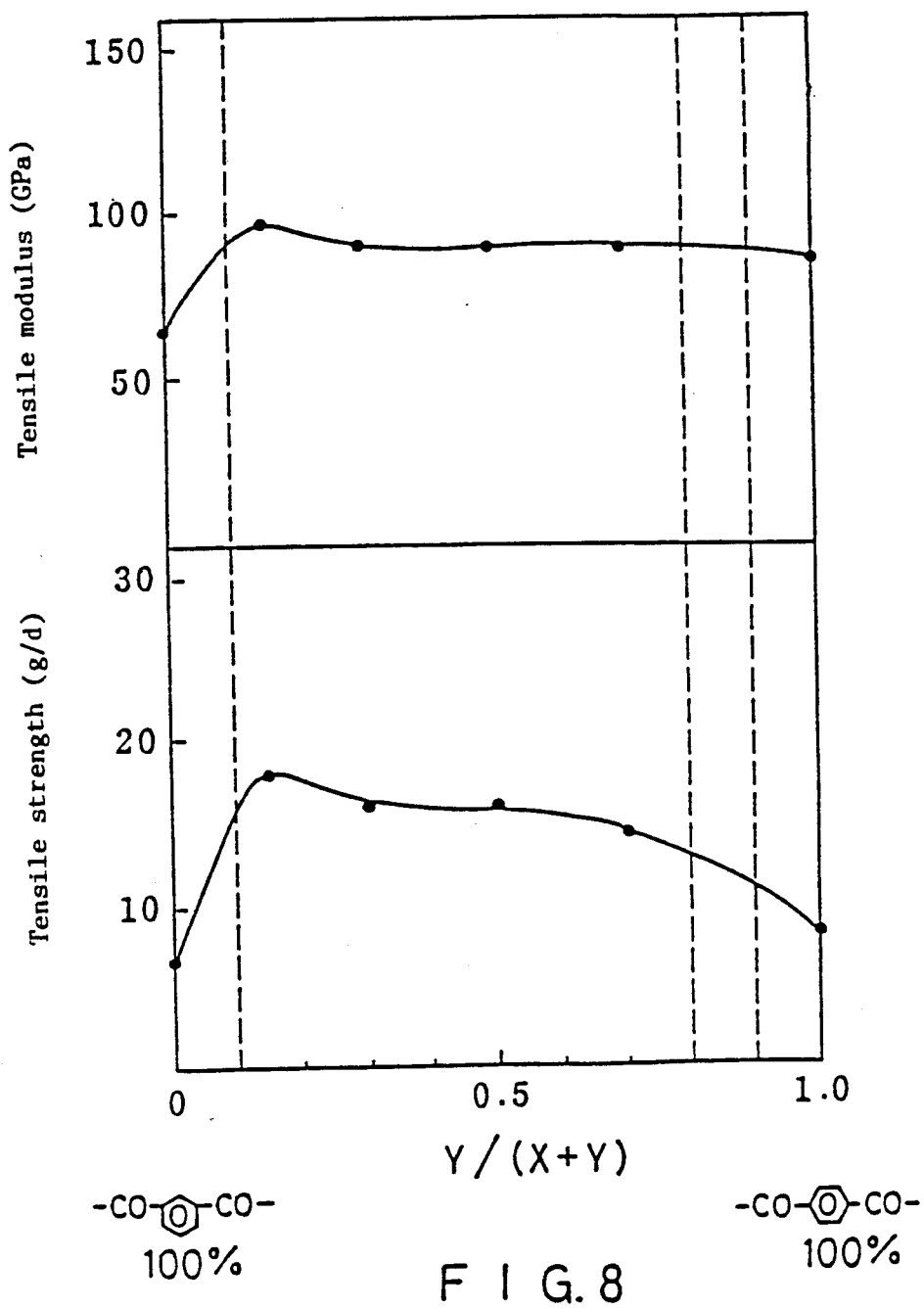
Figure 9:
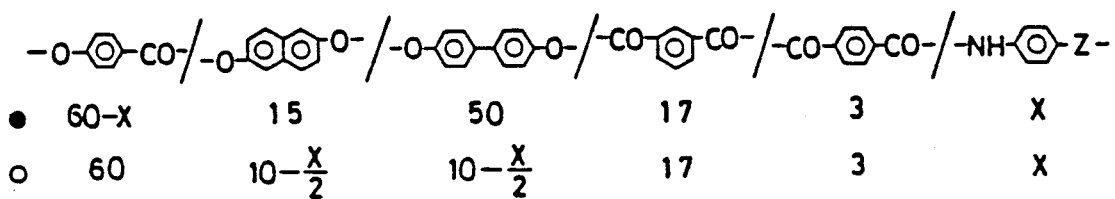
FIG. 9 is a graph showing the dependence of the Izod impact strength on the amount of unit (VI), in the second embodiment of the present invention.
Figure 9:
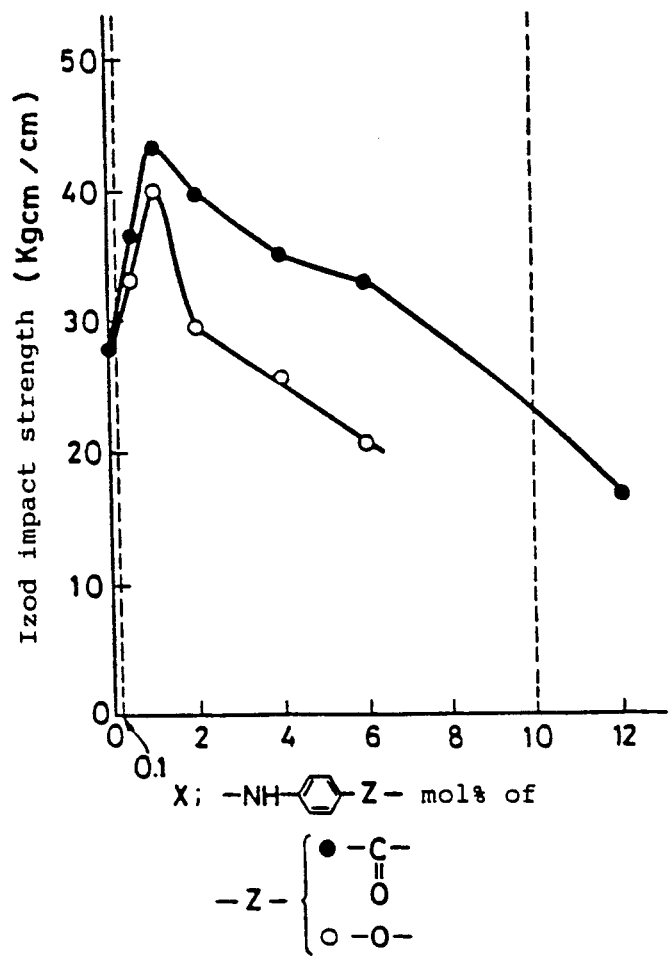
Figure 10:
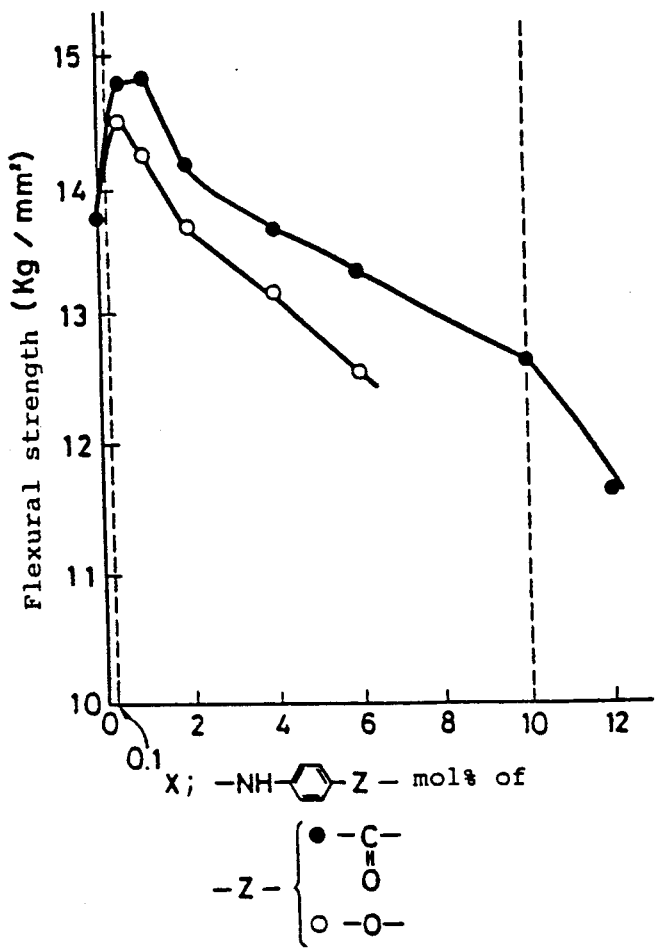
FIG. 10 is a graph showing the dependence of the flexural strength on the amount of unit (VI) in the second embodiment of the present invention.
Figure 11:
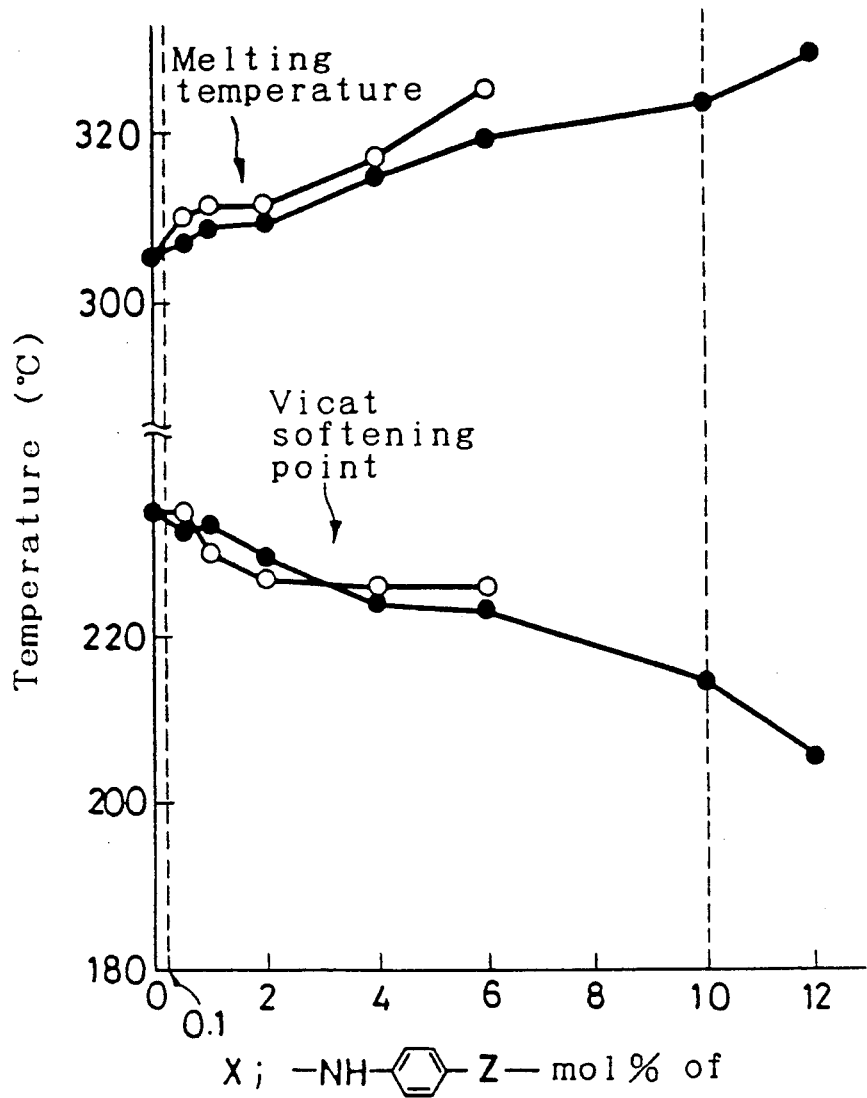
FIG. 11 is a graph showing the dependence of the melting point and Vicat softening point on the amount of unit (VI) in the second embodiment of the present invention.
Figure 12:
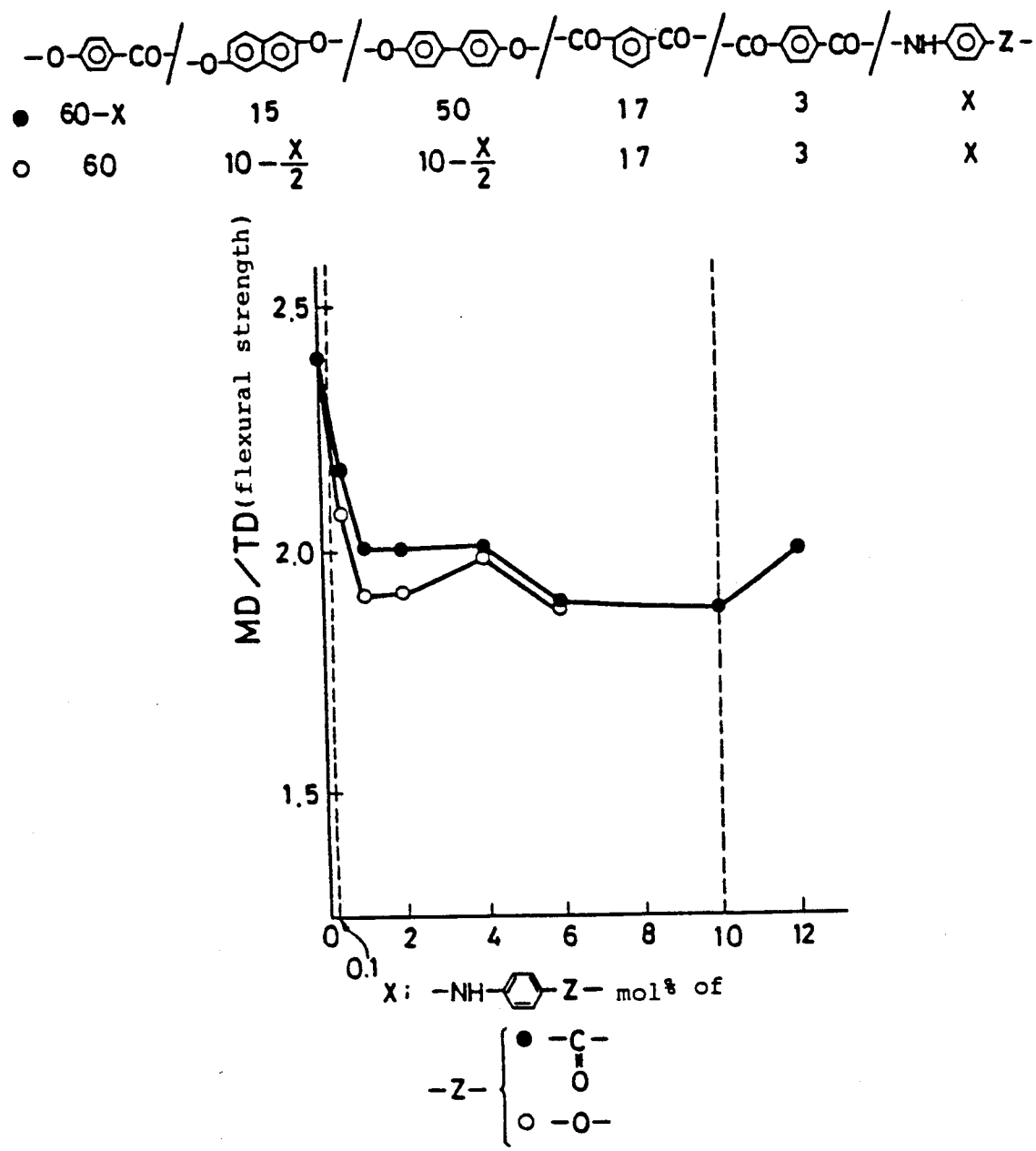
FIG. 12 is a graph showing the dependence of the anisotropy (ratio of the flexural strength in the MD direction to the flexural strength in the TD direction) on the amount of unit (VI) in the second embodiment of the present invention.

To draw the graphs in FIGS. 7 and 8, copolymer polyesters composed of the following units were prepared, with the values of X and Y varied,

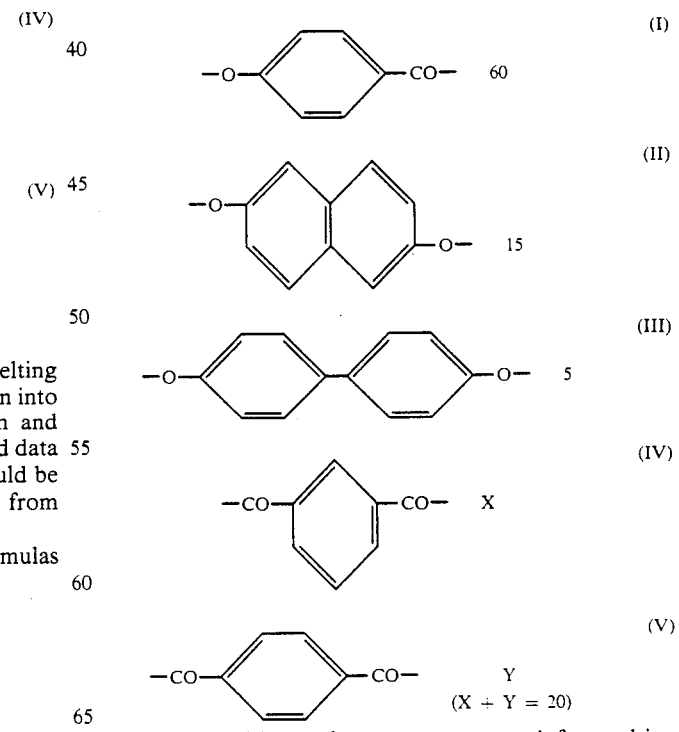

and the resulting polyesters were tested for melting point and Vicat softening point, and were also spun into filaments which were tested for tensile strength and tensile modulus after heat treatment. The measured data were plotted in FIGS. 7 and 8.

The amounts of units (II) to (V) should be such that the molar ratio of [unit (II)+unit (III)] to [unit (IV)+unit (V)] is 1:0.9 to 1:1.1, preferably 1:1. With amounts outside the specified range, the resulting polyester is extremely poor in mechanical strength and heat resistance.

Units (I) to (V) each has the aromatic ring or rings hydrogen atoms on which may be partly substituted by one or more members selected from $C_1$-$C_4$ alkyl groups, $C_1$-$C_4$ alkoxy groups, $C_6$-$C_{10}$ aryl groups, and halogen atoms.

Each of the polymers shown in FIGS. 1 to 8 is composed of unit (I) which is p-acetoxybenzoic acid, unit (II) which is 2,6-diacetoxynaphthalene, unit (III) which is 4,4'-diacetoxybiphenyl, unit (IV) which is isophthalic acid, and unit (V) which is terephthalic acid or 2,6-naphthalenedicarboxylic acid.

In the following, mention will be made of the aromatic polyester amide, which is the second embodiment of the present invention.

According to the second embodiment of the present invention, the unit (I) is represented by the formula below.

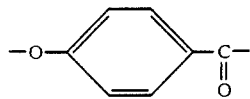

The amount of unit (I) should be 40-70 mol %, preferably 50-65 mol %, of the total amount of units (I) to (VI). If the amount of unit (I) is less than 40 mol %, the resulting polyester amide is poor in heat resistance and provides fibers and molded articles having low mechanical strength. If the amount of unit (I) is more than 70 mol %, the resulting polyester amide has such a high melting point that it is difficult to synthesize and it is poor in spinnability and moldability.

Units (II) and (III) are represented by the following formulas respectively.

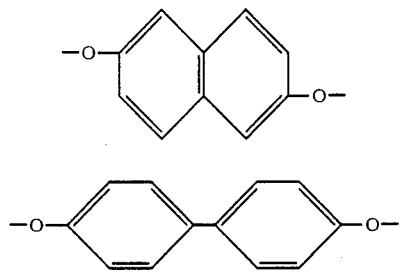

The total amount of units (II) and (III) should be 15-30 mol %, preferably 17-25 mol %, of the total amount of units (I) to (VI). With a total amount less than 15 mol %, the resulting polyester amide has a high melting point and is poor in spinnability and moldability. With a total amount more than 30 mol %, the resulting polyester amide is poor in heat resistance and provides fibers and molded articles having low mechanical strength.

When unit (VI) is —NH—R—CO— (where R denotes a p-phenylene group and/or 2,6-naphthalene group), the amounts of units (II) and (III) should be such that the molar ratio of unit (III) to [unit (II)+unit (III)] is in the range of from 0.15 to 0.85, preferably from 0.25 to 0.75.

When unit (VI) is —NH—R—NH— and/or —NH—R—O— (where R denotes a p-phenylene group and/or 2,6-naphthalene group), the amounts of units (II) and (III) should be such that the molar ratio of unit (III) to [unit (II)+unit (III)+unit (VI)] is in the range of from 0.15 to 0.85, preferably from 0.25 to 0.75. If the amounts of units (II) and (III) (or, and further unit (VI)) are outside the specified range, the resulting polyester amide has a high melting point and is poor in spinnability and moldability and provides filaments and molded articles having low mechanical strength.

Units (IV) and (V) are represented by the formulas below.

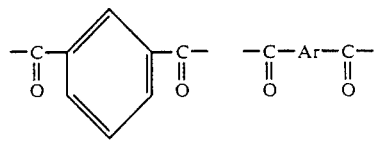

(where Ar denotes a p-phenylene group and/or 2,6-naphthalene group.)

The total amount of units (IV) and (V) should be 15-30 mol %, preferably 17-25 mol %, of the total amount of units (I) to (VI). With a total amount less than 15 mol %, the resulting polyester amide has a high melting point and is poor in spinnability and moldability. With a total amount more than 30 mol %, the resulting polyester amide is poor in heat resistance and provides filaments and molded articles having low mechanical strength.

The amount of unit (IV) should be 5-25 mol %, preferably 10-20 mol %, of the total amount of units (I) to (VI). With the amount of unit (IV) less than 5 mol %, the resulting polyester amide has a high melting point and is poor in spinnability, moldability and tensile modulous. With the amount of unit (IV) more than 25 mol %, the resulting polyester is poor in heat resistance.

The amount of 2,6-naphthalene group contained in unit (V) should be up to 5 mol %. When the amount of 2,6-naphthalene group in unit (V) is more than 5 mol %, the filament comprising the above mentioned aromatic polyester reveals remarkably low tensile strength and low tensile modulus.

The amounts of units (IV) and (V) should be such that the molar ratio of unit (V) to [unit (IV)+unit (V)] is from 0.10 to 0.90, preferably from 0.3 to 0.85. If the amounts of units (IV) and (V) are outside the specified range, the resulting polyester amide has a high melting point and is poor in spinnability and moldability and provides filaments having low mechanical strength.

Unit (VI) is represented by the formula —NH—R—Z— (where R denotes a p-phenylene group and/or m-phenylene group; and Z denotes one or more groups selected from —NH—, —O—, and/or

The amount of unit (VI) should be 0.1 to 10 mol % of the total amount of units (I) to (VI). With an amount less than 0.1 mol %, the resulting polyester amide is not sufficiently improved in anisotropy. With an amount more than 10 mol %, the resulting polyester amide has a high melt viscosity and is poor in moldability, heat resistance, and mechanical strength.

Copolymer polyester amides composed of the following units were prepared, with the value of X varied,

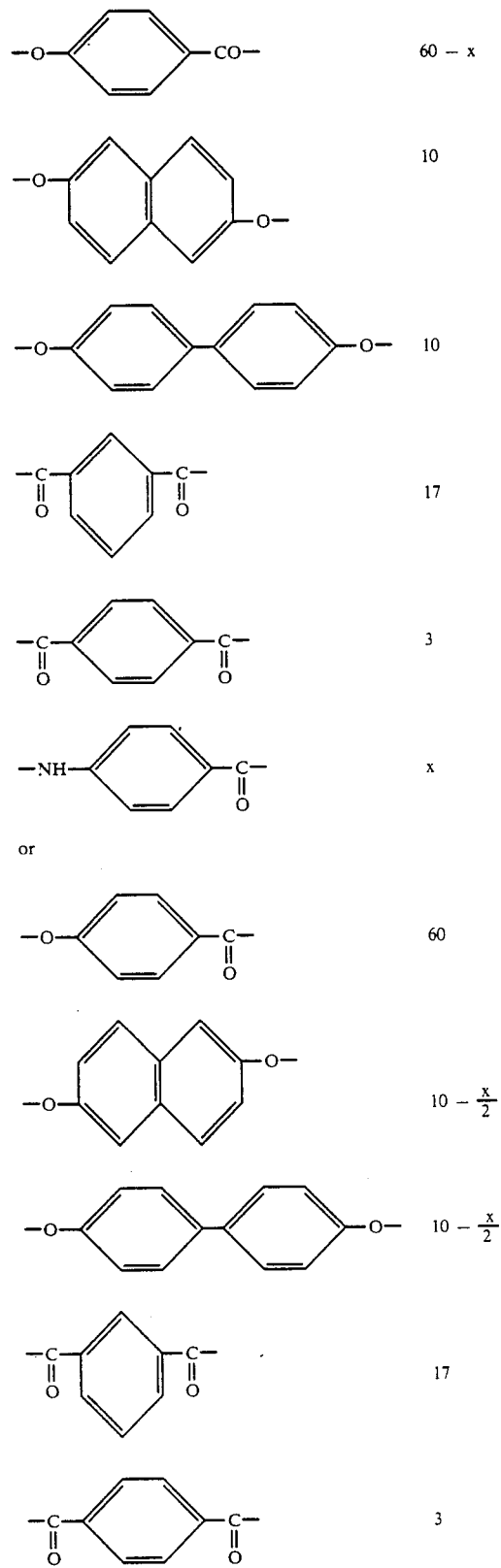

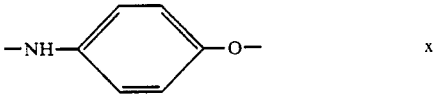

and the resulting polyester amides were made into molded articles by injection molding. The molded articles were tested for Izod impact strength, flexural strength, melting point and Vicat softening point, and anisotropy (in terms of the ratio of flexural strength in the MD direction to that in the TD direction). The results are shown in FIGS. 9 to 12, respectively. The results are also shown in Table 4 (whose detailed description will be given later in reference to Examples).

Each of the polymers shown in FIGS. 9 to 12 is composed of unit (I) which is p-acetoxybenzoic acid, unit (II) which is 2,6-diacetoxynaphthalene, unit (III) which is 4,4'-acetamidebenzoic acid and/or p-acetamide-phenol.

When unit (VI) is —NH—R—NH— and/or —NH—R—O— (where R denotes a p-phenylene group and/or 2,6-naphthalene group), the amounts of units (II), (III), and (VI) should be such that the molar ratio of [unit (II)+unit (III)+unit (VI)] to [unit (IV)+unit (V)] is 1:0.9 to 1:1.1, preferably 1:1.

When unit (VI) is —NH—R—CO— (where R denotes a p-phenylene group and/or 2,6-naphthalene group), the amounts of units (II), (III), (IV), and (V) should be such that the molar ratio of [unit (II)+unit (III)] to [unit (IV)+unit (V)] is 1:0.9 to 1:1.1, preferably 1:1. With amounts outside this range, the resulting polymer is poor in mechanical strength and heat resistance.

The aromatic polyester and aromatic polyester amide of the present invention are not specifically limited in the method of production. They may be synthesized by the reaction commonly employed for ester formation, such as melt polymerization, heated solution polymerization, heated suspension polymerization, low-temperature solution polymerization, and interfacial polymerization. The melt polymerization by ester interchange is desirable. To be specific, polymerization is carried out by heating p-acetoxybenzoic acid, 2,6-naphthalenediacetate, 4,4'-diacetoxybiphenyl, isophthalic acid, terephthalic acid or 2,6-naphthalenedicarboxylic acid, and p-acetamidebenzoic acid corresponding to the units (I) to (V) or the units (I) to (VI), while removing acetic acid which is formed as a by-product.

A catalyst may be used for the polymerization, if necessary. The catalyst may be previously added to the starting materials; alternatively it may be added to the reaction system when the reaction starts. Examples of the catalyst include germanium oxide, stannous oxalate, stannous acetate, dialkyl tin oxide, diaryl tin oxide, titanium dioxide, titanium alkoxide, antimony trioxide, antimony acetate, sodium acetate, potassium acetate, calcium acetate, rubidium acetate, ferrous acetate, aluminum chloride, amines, amides, and p-toluenesulfonic acid. Preferable among them are sodium acetate and rubidium acetate.

The polymerization temperature is not specifically limited; but usually it is from 180° C. to 400° C., preferably from 200° C. to 370° C. Polymerization at temperatures lower than 180° C. is slow, and polymerization at temperatures higher than 400° C. causes discoloration and thermal decomposition.

The polymerization is not specifically limited in pressure; however, the polymerization should preferably be carried out such that the pressure in the initial stage is close to the atmospheric pressure and then it is reduced as the polymerization proceeds.

The reaction should preferably be carried out with stirring to prevent the coloration and decomposition of resin by local overheating and to facilitate the removal of acetic acid formed as a by-product. Also, the reaction should preferably be carried out under an atmosphere of inert gas such as nitrogen and argon to prevent the oxidative decomposition of resin by oxygen.

The aromatic polyester and aromatic polyester amide of the present invention may be incorporated with a proper amount of stabilizer, coloration inhibitor, metal deactivator, and/or UV light absorber, according to need. Preferred examples of the stabilizer and coloration inhibitor include triaryl phosphite ester, trialkyl phosphite ester, triaryl phosphate ester, trialkyl phosphate ester, and hindered phenol. Preferred examples of the UV light absorber include benzotriazoles.

The aromatic polyester and/or aromatic polyester amide of the present invention may be easily processed into filaments or molded articles by any melt molding method. For example, it may be processed into filaments by melt spinning at 280°-400° C., preferably 300°-340° C. It may be processed into molded articles by extrusion molding, injection molding blow molding, or compression molding. Injection molding may be carried out at an injection temperature of 250°-350° C., preferably 280°-330° C., and at an injection pressure of 100-500 kgf/cm$^2$, preferably 200-300 kgf/cm$^2$.

The thus obtained filaments and molded articles have polymer molecules which remain highly oriented as they are oriented at the time of spinning or molding. This is the reason why they exhibit high strength, high modulus, and high heat resistance.

The filaments and molded articles obtained from the aromatic polyester and/or polyester amide of the present invention may be further improved in heat resistance and mechanical strength upon heat treatment. This is because heat treatment promotes the solid phase polymerization and relaxes the residual stress (or strain) formed at the time of molding.

The heat treatment may be carried out in an atmosphere of inert gas (such as nitrogen, carbon dioxide, argon, and helium) or in an atmosphere of flowing oxygen (such as air) or in a vacuum. The heat treatment should preferably be carried out in an inert atmosphere or vacuum to protect the polymer from oxidative deterioration.

The heat treatment should be carried out at 100°-350° C., preferably 200°-300° C. At a temperature lower than specified above, the heat treatment does not fully produce its effect. At a temperature higher than specified above, the heat treatment causes the fusion bonding of filaments or deforms or melts molded articles. Effective heat treatment may be accomplished when the temperature is gradually raised with time. The heat treatment should be carried out for several hours to several hundred hours, preferably 3-24 hours. The duration of heat treatment varies depending on the temperature of heat treatment. The higher the temperature of heat treatment, the shorter the duration of heat treatment The aromatic polyester of the present invention has the following features.

(1) It is superior in spinnability, moldability and heat resistivity to conventional aromatic polyesters.
(2) It provides filaments having by far higher tensile modulus and tensile strength than those obtained from conventional aromatic polyester. It provides also molded (injection molding, extrusion molding) articles having superior mechanical strength.
(3) It is not subject to gelation (crosslinking) at the time of spinning, molding, or synthesis. Therefore, it provides filaments and molded articles which retain their mechanical strength and quality almost intact.
(4) It is highly stable to chemicals.
(5) It is highly stable to wet and heat.

The aromatic polyester amide of the present invention has the following features in addition to the above-mentioned features of the aromatic polyester.

(1) It is greatly improved in anisotropy.
(2) It has improved mechanical strength, especially impact strength.

Next, the aromatic polyester filament and the aromatic polyester amide filament in accordance with the third and fourth embodiments of the present invention are described.

These filaments can be spun easily out of the aromatic polyester or the aromatic polyester amide according to the first or second embodiment of the present invention, by using a commonly used orifice-equipped extruder after making the material into a melting state by heating the material at or above a temperature which is called "flow temperature". For this purpose, a normal spinning nozzle having circular holes with their diameters being about 0.05 to 2.0 mm may be used, which is used commonly for the spinning of polyethylene terephthalate. In such a case, the number and shape of holes of the spinning nozzle are not limited.

Spinning of the above described aromatic polyester or aromatic polyester amide by mixing the material with a small amount of other polymer or a commonly used additive agent is applicable, provided that the resulting filament has the same characteristics as those of the filaments of the present invention.

Fibrous material extruded from an orifice changes into fibers passing through a solidification zone or a cooling zone. At this stage of the process, the temperature distribution and atmosphere from the orifice to the cooling zone may be designed freely by using hot air, cool air, a pipe, a heater, an inert gas and the like. If it is necessary, cooling may be achieved by using water instead of a gas. Each of the filaments according to the third and fourth embodiments of the present invention has a superior mechanical strength, even in a state of cooled filaments after their extrusion from the orifice. If necessary, however, mechanical strength of the cooled filaments can be improved further by the additional heating treatment described before. The heating treatment also may be performed with or without loading a stress.

In the following, mention will be made of the inorganic filler-containing aromatic polyester (which is the fifth embodiment of the present invention) and the inorganic filler-containing aromatic polyester amide (which is the sixth embodiment of the present invention).

The aromatic polyester and aromatic polyester amide used in the fifth and sixth embodiments are substantially identical with those used in the first and second embodiments mentioned above.

The inorganic filler used in the fifth and sixth embodiments are not specifically limited. Examples of the inorganic filler include talc, calcium carbonate (ground, light, and colloidal), mica, glass fiber, barium sulfate, calcium silicate, clay, magnesium carbonate, wollastonite, alumina, silica, iron oxide, calcium sulfate, glass beads, glass powder, white carbon, hollow glass beads, silica sand, silicastone, carbon black, aluminum hydroxide, magnesium hydroxide, zinc oxide, white lead, basic magnesium carbonate, asbestos, zeolite, molybdenum, titanium oxide, diatomaceous earth, sericite, Sirasu, graphite, calcium hydroxide, calcium sulfite, gypsum fiber, carbon fiber, quartz powder, bentonite, metal whisker, and sodium sulfate. They may be used alone or in combination with one another. Preferable among them are platy fillers (such as talc and mica), fibrous fillers (such as glass fiber and gypsum fiber), needle-like fillers (such as wollastonite, quartz powder, and glass powder), and colloidal fillers (such as precipitated calcium carbonate having an average particle diameter smaller than 1.0 $\mu m$). They provide the composition with balanced heat resistance and mechanical strength.

The inorganic fillers used in the present invention may undergo surface treatment, if necessary. Examples of the surface treating agent include silane coupling agents, titanate coupling agents, borane coupling agents, higher fatty acids, and surface active agents.

The surface treating agent may be applied to an inorganic filler prior to mixing with the resin, or added to the mixing equipment when an inorganic filler is incorporated into the resin.

The inorganic filler-containing aromatic polyester composition according to the fifth embodiment of the present invention is composed of 100 parts by weight of the aromatic polyester resin in the first embodiment and 1-400 parts by weight, preferably 10-250 parts by weight, of the above-mentioned inorganic filler.

The inorganic filler-containing aromatic polyester amide composition according to the sixth embodiment of the present invention is composed of 100 parts by weight of the aromatic polyester amide resin in the second embodiment and 1-400 parts by weight, preferably 10-250 parts by weight, of the above-mentioned inorganic filler.

In both of the above-mentioned compositions, the amount of inorganic filler should be less than 400 parts by weight; otherwise, the resulting composition has great difficulties in injection molding and is liable to give molded articles having flow marks, poor appearance, and low mechanical strength.

The compositions of the present invention may be incorporated with other resins, antioxidant, coloration inhibitor, stabilizer, UV light absorber, plasticizer, lubricant (such as molybdenum disulfide, silicone oil, fluoroplastics, and graphite), and flame retardant (such as tetrabromobisphenol A and antimony trioxide).

The compositions of the present invention may be produced by blending the resin with an inorganic filler using an ordinary mixing machine such as single-screw extruder, twin-screw extruder, Banbury mixer, mixing roll, Brabender, and kneader.

They can also be produced by adding an inorganic filler to the resin component in molten state in the reactor, or by melt-mixing the resin component and inorganic filler in a molding machine.

The inorganic filler-containing aromatic polyester and aromatic polyester amide of the present invention are superior in heat resistance, tensile strength, surface scratch resistance, and reduced anisotropy. These properties lead to the secondary features such as good arc resistance, good solder resistance, and low molding shrinkage. These characteristic properties make the compositions suitable for use as precision injection moldings for electric and electronic parts and machine parts, and for use as oven plates.

In the following, mention will be made of the magnetic powder-containing compositions pertaining to the seventh and eighth embodiments of the present invention.

The aromatic polyester and aromatic polyester amide used in the seventh and eighth embodiments are substantially identical with those used in the first and second embodiments mentioned above.

The magnetic powder used in the present invention is not specifically limited. Preferred examples of the magnetic powder include ferrite magnetic powder represented by $MOFe_2O_3$ (where M denotes Ba, Sr, Ca, Mg, Mn, Fe, Cu, Ni, Co, Zn, and/or Pb), and rare earth magnetic powder represented by $RCo_5$ (where R denotes Sm, Pr, Ce, and/or La), $Sm_2X_{17}$ (where X denotes Co, Fe, Cu, Zr, Ti, and/or Hf), or Nd—Fe—B. They may be used alone or in combination with one another.

The magnetic powder used in the present invention is not specifically limited in particle diameter. However, it should preferably have a particle diameter in the range of 0.1 to 100 $\mu m$, more desirably 1 to 50 $\mu m$. With a particle diameter smaller than 0.1 $\mu m$, the magnetic powder is liable to agglomeration, which prevents the uniform dispersion of the powder in the composition. With a particle diameter larger than 100 $\mu m$, the magnetic powder impairs the surface smoothness (appearance) of the molded article and makes molding extremely difficult.

The magnetic powder should be used in an amount of 100-1900 parts by weight, preferably 400-1150 parts by weight, for 100 parts by weight of the binder resin. With an amount less than 100 parts by weight, the resulting molded article is poor in magnetic properties and does not function as a magnet. With an amount in excess of 1900 parts by weight the resulting composition is poor in flowability and hence moldability and provides molded articles having low mechanical strength.

The magnetic powder used in the present invention may undergo surface treatment, if necessary. Examples of the surface treating agent include silane coupling agents, titanate coupling agents, borane coupling agents, higher fatty acids.

The surface treating agent may be applied to a magnetic powder prior to mixing with the resin, or added to the mixing equipment when a magnetic powder is incorporated into the resin.

The mixing of the resin and magnetic powder may be accomplished by using such mixing machine as single-screw extruder, twin-screw extruder, kneader, Banbury mixer, two-roll mill, and Brabender.

The mixing of the resin and magnetic powder may also be accomplished by adding a magnetic powder to the resin in molten state in the reactor, or by melt-mixing the resin and magnetic powder in a molding machine.

The compositions of the present invention may be incorporated with other resins, antioxidant, coloration inhibitor, stabilizer, UV light absorber, plasticizer, lubricant (such as molybdenum disulfide, silicone oil, fluoroplastics, and graphite), and flame retardant (such as tetrabromobisphenol A and antimony trioxide).

EXAMPLES

The invention will be described in more detail with reference to the following examples.

The test methods used in the examples are explained first.

(1) Preparation of filaments

After drying at 120° C. for 5 hours, a sample polymer was charged into a nitrogen-pressed spinning apparatus equipped with a capillary nozzle 3 mm long and 0.3 mm in diameter. Spinning was carried out at varied temperatures under a nitrogen pressure of 3 kgf/cm² and at a take-up speed of 150 m/min.

(2) Preparation of injection molded articles

After crushing and drying (at 120° C. for 5 hours), a sample polymer was made into test specimens for measuring physical properties by injection molding using an injection molding machine (Model SAV-60-52, made by Sanjo Seiki Manufacturing Co., Ltd.) at a mold temperature of 120° C., an injection pressure of 250 kg/cm², and a cylinder temperature high enough to cause the resin to fill the mold cavity completely. Test specimens containing an inorganic filler or magnetic powder were prepared by injection molding in the same manner as above from pellets formed by melt-mixing the resin with a prescribed amount of inorganic filler or magnetic powder using a 20-mm single screw extruder (made by Thermoplastic Kogyo Co., Ltd.).

(3) Injection molding temperature

The injection molding temperature is a cylinder temperature at which a test specimen (measuring $\frac{1}{2} \times 5 \times \frac{1}{8}$ inch) was prepared under the above-mentioned injection molding conditions. The lower the injection molding temperature, the better the moldability of sample polymer.

(4) Melting temperature

The melting temperature is defined as a temperature at which a sample polymer has a viscosity of 10000 poise when extruded through a nozzle (0.5 mm in diameter and 1.0 mm long) under a load of 10 kgf using a flow tester (made by Shimadzu Corp.). The lower the melting temperature, the better the spinnability and moldability of a sample polymer.

(5) Vicat softening point Measured according to JIS K7206.

(6) Tensile strength and tensile modulus of filaments Measured according to ASTM D3822.

(7) Izod impact strength

Measured according to ASTM D256 on a notched rod-like specimen ($\frac{1}{2} \times 5 \times \frac{1}{8}$ inch) formed by injection molding.

(8) Wet-heat stability

The wet-heat stability is expressed in terms of comparison between the initial Izod impact strength of an injection molded specimen ($\frac{1}{2} \times 5 \times \frac{1}{4}$ inch) and the impact strength of the same specimen measured after immersion in hot water (96° C.) for 600 hours.

(9) Flexural strength

Measured according to ASTM D790 on a molded rod-like specimen ($\frac{1}{2} \times 5 \times \frac{1}{8}$ inch). (This test piece was replaced by the one measuring $\frac{1}{2} \times 5 \times \frac{1}{4}$ inch for a sample polymer containing a magnetic powder.)

(10) Anisotropy (MD/TD)

Each sample polymer was molded into a flat plate measuring 120×120×2 mm. Test pieces (14 mm wide) were cut out of this flat plate, one in the MD direction (parallel to the resin flow direction) and the other in the TD direction (perpendicular to the resin flow direction). The test pieces were tested for flexural strength. Anisotropy was judged from comparison between the flexural strength measured in the MD direction and the flexural strength measured in the TD direction. The greater the MD/TD ratio, the greater the anisotropy of a sample polymer.

Modulus of the samples was measurd according to ASTM D790.

(11) Heat distortion temperature

Measured according to ASTM D648 (18.6 kgf/cm²) on a molded rod-like specimen ($\frac{1}{2} \times 5 \times \frac{1}{8}$ inch).

(12) Surface scratch resistance

Surface scratch resistance was measured with a pencil scratch tester conforming to JIS K5401, with the pencil replaced by a 100-yen coin. (This modification was made to obtain data for practical use.) A test specimen in plate form (measuring 120×120×2 mm) was scratched five times back and forth in the resin flow direction with the 100-yen coin under a load of 1000 g. The specimen was visually examined for scratches and the surface scratch resistance of the specimen was rated according to the following criterion.

Good . . . no scratches are noticed

Poor . . . scratches are noticed

(13) Magnetic properties

Magnetic properties were evaluated by measuring the residual magnetic flux density ($B_r$), coercive force ($H_c$), and maximum energy product $(BH)_{max}$ on a test piece measuring 1 inch in diameter and $\frac{1}{2}$ inch thick, using a BH loop tracer made by Yokogawa Electric Corp.

EXAMPLE 1

In a 5-liter separable flask equipped with a sealed stirrer, gas inlet tube, and condenser were placed 1080 g (6 mol) of p-acetoxybenzoic acid, 366 g (1.5 mol) of 2,6-diacetoxynaphthalene, 135 g (0.5 mol) of 4,4'-diacetoxybiphenyl, 282 g (1.7 mol) of isophthalic acid, 50 g (0.3 mol) of terephthalic acid, and 0.5 g of sodium acetate (as a catalyst).

The atmosphere in the flask was replaced with argon by repeating twice evacuation and the introduction of dry argon. The reactants were heated to 250° C. with stirring under a weak argon stream, so that the reactants melted with the liberation of acetic acid. The reactants were kept at 250° C. for about 2 hours and then heated to 280° C. Reaction was carried out at 280° C. for about 1 hour, with 490 ml of acetic acid collected.

The content in the flask was heated to 320° C. and kept at this temperature for 15 minutes. The content was further heated to 350° C. and kept at this temperature for 15 minutes. The amount of acetic acid collected up to this time was 550 ml.

The flask was evacuated and polymerization was continued at 350° C. for about 5 minutes at 90 mmHg, for about 5 minutes at 30 mmHg, for about 10 minutes at 3 mmHg, and finally for about 15 minutes at 0.3 mmHg. There was obtained a viscous opaque yellowish white product. The product was cooled under an argon stream and then discharged. Thus there was obtained an aromatic polyester.

A specimen of this aromatic polyester was examined for optical anisotropy under a polarizing microscope. The specimen was found to have good optical anisotropy.

This aromatic polyester was subjected to melt spinning using a nitrogen-pressed spinning apparatus equipped with a single capillary nozzle (spinneret) 3.0 mm long and 0.3 mm in diameter. The resulting filaments were found to have a tensile strength of 11.6 g/d and a tensile modulus of 77.9 GPa.

The filaments were tested again for mechanical strength after heat treatment under nitrogen at 100° C. for 3 hours, at 260° C. for 6 hours, and at 280° C. for 3 hours. The heat-treated filaments were found to have a tensile strength of 18.0 g/d and a tensile modulus of 95.6 GPa.

This aromatic polyester was injection-molded into a test piece, which was tested for Izod impact strength and wet-heat stability. It was found to have an impact strength of 42.3 kg.cm/cm and a wet-heat stability of 82%.

EXAMPLES 2 TO 15 AND COMPARATIVE EXAMPLES 1 to 8 AND 10 TO 13

The same procedure as in Example 1 was repeated to prepare aromatic polyesters of different compositions as shown in Tables 1 and 2. The polymers and the filaments and injection-molded test pieces prepared therefrom were tested for physical properties. The results are shown in Tables 1 and 2.

These aromatic polyesters all exhibited optical anisotropy at a temperature higher than the flow temperature as shown in FIGS. 1 to 8.

COMPARATIVE EXAMPLE 9

The same procedure as in Example 1 was repeated except that the flask was charged with 1440 g (8 mol) of p-acetoxybenzoic acid, 183 g (0.75 mol) of 2,6-diacetoxynaphthalene, 68 g (0.25 mol) of 4,4'-diacetoxybiphenyl, 141 g (0.85 mol) of isophthalic acid, and 25 g (0.15 mol) of terephthalic acid, and that the final reaction temperature was changed to 380° C. The resulting polymer was too brittle to be spun. This polymer has a composition represented by the following formula.

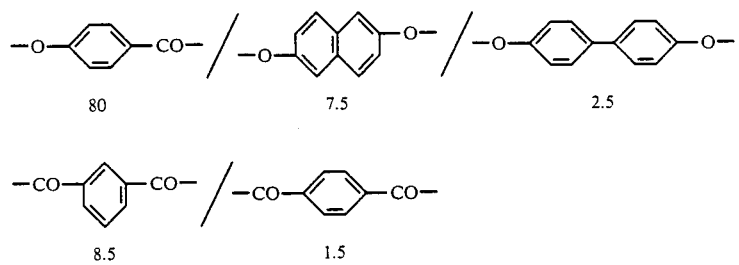

EXAMPLE 16

In a 5 liter separable flask equipped with a sealed stirrer, gas inlet tube, and condenser were placed 1044 g (5.8 mol) of p-acetoxybenzoic acid, 366 g (1.5 mol) of 2,6-diacetoxynaphthalene, 135 g (0.5 mol) of 4,4'-diacetoxybiphenyl, 282 g (1.7 mol) of isophthalic acid, 50 g (0.3 mol) of terephthalic acid, 32.6 g (0.2 mol) of p-acetaminobenzoic acid, and 0.1 g of sodium acetate (as a catalyst).

Reaction was carried out in the same manner as in Example 1. Thus there was obtained an aromatic polyester amide.

A specimen of this aromatic polyester amide was examined with heating for optical anisotropy under a polarizing microscope. The specimen was found to have good optical anisotropy. It was also tested for physical properties in the same manner as mentioned above. The results are shown in Table 3.

EXAMPLES 17 AND 18 AND COMPARATIVE EXAMPLES 14 TO 18

The same procedure as in Example 16 was repeated to prepare aromatic polyester amides of different compositions as shown in Table 3. The polymers were tested for physical properties in the same manner as mentioned above. The results are shown in Table 3.

EXMAPLE 19

In a 5-liter separable flask equipped with a sealed stirrer, gas inlet tube, and condenser were placed 1071 g (5.95 mol) of p-acetoxybenzoic acid, 366 g (1.5 mol) of 2,6-diacetoxynaphthalene, 135 g (0.5 mol) of 4,4'-diacetoxybiphenyl, 282 g (1.7 mol) of isophthalic acid, 50 g (0.3 mol) of terephthalic acid, 8.2 g (0.05 mol) of p-acetaminobenzoic acid, and 0.1 g of sodium acetate (as a catalyst).

Reaction was carried out in the same manner as in Example 1. Thus there was obtained an aromatic polyester amide.

A specimen of this aromatic polyester amide was examined with heating for optical anisotropy under a polarizing microscope. The specimen was found to have good optical anisotropy. It was also tested for physical properties. It was found to have a melting temperature of 307° C. and a Vicat softening point of 233° C. It was injection-molded into a test piece, which was found to have an Izod impact strength of 36.5 kg.cm/cm, a flexural strength of 14.8 kg/mm$^2$, and a ratio of 2.2 indicating the anisotropy (MD/TD) of flexural strength. These data suggest the superiority of the aromatic polyester amide over the aromatic polyester without amide group obtained in Example 1.

EXAMPLES 20 TO 28 AND COMPARATIVE EXAMPLES 19 TO 22

The same procedure as in Example 19 was repeated to prepare aromatic polyester amides of different compositions as shown in Table 4. The polymers were tested for physical properties in the same manner as mentioned above. The results are shown in Table 4 and FIGS. 9 to 12.

Remarks:

The following Examples 29 to 49 and Comparative Examples 23 to 29 are concerned with the inorganic filler-containing aromatic polyester compositions and inorganic filler-containing aromatic polyester amide compositions pertaining to the fifth and sixth embodiments of the present invention.

EXAMPLE 29

The aromatic polyester (700 g) obtained in Example 1 was incorporated with 300 g of glass fiber, 11 μm in average diameter and 3 mm long (FE-S-03-1208 PE, made by Fuji Fiberglass Co., Ltd.) and the mixture was pelletized. The pellets were tested for injection molding temperature and were also injection-molded into test pieces, which were tested for anisotropism, heat distortion temperature, and surface scratch resistance. The results are shown in Table 5.

EXAMPLES 30 TO 41

Inorganic filler-containing aromatic polyester compositions were prepared from various kinds of resins shown in Table 8 by mixing with glass fiber in the mixing ration shown in Table 5. The resulting compositions were tested for physical properties in the same manner as mentioned above. The results are shown in Table 5.

COMPARATIVE EXAMPLES 23 TO 29

Inorganic filler-containing aromatic polyester compositions were prepared from various kinds of resins shown in Table 8 by mixing with similar glass fiber used in Example 29 in the mixing ratio showing in Table 5. The resulting compositions were tested for physical properties in the same manner as mentioned above. The results are shown in Table 5.

EXAMPLE 42

An inorganic filler-containing aromatic polyester composition was prepared as follows. The aromatic polyester (700 g) obtained in Example 1 was incorporated with 300 g of wollastonite (UM-8N, made by Hayashi Kasei Co., Ltd.). The resulting composition was tested for physical properties in the same manner as mentioned above. The results are shown in Table 6.

EXMAPLES 43 TO 49

Inorganic filler-containing aromatic polyester compositions were prepared from various kinds of resins shown in Table 8 by mixing with wollastonite or talc (talcum powder PKP, made by Hayashi Kasei Co., Ltd.) in the mixing ratio shown in Table 6. The resulting compositions were tested for physical properties in the same manner as mentioned above. The results are shown in Table 6.

Remarks:

The following Examples 50 to 61 and Comparative Examples 30 to 33 are concerned with the magnetic powder-containing aromatic polyester compositions and magnetic powder-containing aromatic polyester amide compositions pertaining to the seventh and eighth embodiments of the present invention.

EXMAPLE 50

The aromatic polyester (200 g) obtained in Example 1 was incorporated with Ba-ferrite (TR-M made by Tone Sangyo Co., Ltd.) and the mixture was pelletized by extrusion. The pellets were tested for injection molding temperature and were also injection-molded into test pieces, which were tested for magnetic properties, flexural strength, and heat distortion temperature. The results are shown in Table 7.

EXAMPLE 51 TO 61 AND COMPARATIVE EXAMPLES 30 TO 33

Magnetic powder-containing resin compositions were prepared from various kinds of resins (including nylon 6) shown in *Table 8 by mixing with ferrite in the mixing ratio shown in Table 7. The resulting compositions were tested for physical properties in the same manner as mentioned above. The results are shown in Table 7.

Review of Examples and Comparative Examples:

The following is noted from the above-mentioned Examples and Comparative Examples.

First, mention will be made of the aromatic polyester pertaining to the first embodiment of the present invention. As Tables 1 and 2 and FIGS. 1 to 8 apparently show, the aromatic polyesters in Examples are all superior in not only mechanical strength (especially tensile modulus of filaments) but also spinnability, moldability, and wet-heat stability. By contrast, the aromatic polyesters in Comparative Examples all lack these characteristic properties. As compared with the conventional aromatic polyesters shown in Comparative Examples 10 to 13, the known polyester shown in Comparative Example 10 (which is disclosed in Japanese Patent Laid-open No.84821/1983) is poor in wet-heat stability, the known polyester shown in Comparative Example 11 (which is disclosed ind Japanese Patent Laid-open No.5094/1979) is poor in tensile modulus of filaments, spinnability, and moldability, the known polyester shown in Comparative Example 12 (which is disclosed in Japanese Patent Laid-open No.62630/1984) is considerably poor in spinnability and moldability, and the known liquid crystalline polyester shown in Comparative Example 13 (which had lower content of unit (IV) than in the present invention disclosed in Japanese Patent Laid-open No. 284221/1988, U.S. Pat. No. 4,851,497) is poor in tensile modulus of filaments after heat treatment.

Secondly, mention will be made of the aromatic polyester amide pertaining to the second embodiment of the present invention. As Tables 3 and 4 and FIGS. 9 to 12 apparently show, the aromatic polyester amides in Examples are comparable in spinnability, heat resistance, and mechanical strength to the aromatic polyesters of the present invention. Moreover, they produce the effect of relaxing anisotropy sufficiently. By contrast, the aromatic polyester amides in Comparative Examples all lack these characteristic properties. Comparative Examples 20 to 22 show that as compared with the conventional polyester amides, the one in Comparative Example 20 (which was prepared by introducing an amide linkage into the polyester disclosed ind Japanese Patent Laid-open No.84821/1983) and the one in Comparative Example 21 (which was prepared by introducing an amide linkage into the polyester disclosed in Japanese Patent Laid-open No.5094/1979) are both poor in mechanical strength, and the one in Comparative Example 22 (which was prepared by introducing an amide linkage into the polyester disclosed in Japanese Patent Laid-open No.62630/1984) is poor in the effect of relaxing anisotropy.

Thirdly, mention will be made of the inorganic filler-containing aromatic polyesters and inorganic filler-containing aromatic polyester amides pertaining to the fifth and sixth embodiments of the present invention. As Tables 5 and 6 apparently show, the inorganic filler-containing aromatic polyesters and inorganic filler-containing aromatic polyester amides in Examples are all superior in heat resistance, moldability, mechanical strength, and surface scratch resistance. By contrast, the inorganic filler-containing compositions in Comparative Examples all lack these characteristic properties. Especially, the one in Comparative Example 23 (formed by adding an inorganic filler to the polyester disclosed in Japanese Patent Laid-open No.84821/1983) is poor in heat resistance and the effect of relaxing anisotropy; the one in Comparative Example 24 (formed by adding an inorganic filler to the polyester disclosed in Japanese Patent Laid-open No.5094/1979) is poor in the effect of relaxing anisotropy; and the one in Comparative Example 25 (formed by adding an inorganic filler to the polyester disclosed in Japanese Patent Laid-open No.62630/1984) is poor in moldability and the effect of relaxing anisotropy.

Finally, mention will be made of the magnetic powder-containing aromatic polyesters and magnetic powder-containing aromatic polyester amides pertaining to the seventh and eighth embodiments of the present invention. As Tables 5 and 7 apparently show, the magnetic powder-containing aromatic polyesters and magnetic powder-containing aromatic polyester amides in Examples are superior in mechanical strength, moldability, and heat resistance. By contrast, the magnetic powder-containing compositions in Comparative Examples all lack these characteristic properties. The one in Comparative Example 30 (formed by adding a magnetic powder to the polyester disclosed in Japanese Patent laid-open No.84821/1983) is poor in heat resistance and mechanical strength; the one in Comparative Example 31 (formed by adding a magnetic powder to the polyester disclosed in Japanese Patent Laid-open No.5094/1979) is poor in mechanical strength and moldability; the one in Comparative Example 32 (formed by adding a magnetic powder to the polyester disclosed in Japanese Patent laid-open No.62630/1984) is poor in moldability; and the one in Comparative Example 33 (formed by adding a magnetic powder to nylon) is poor in mechanical strength and heat resistance.

The aromatic polyester of the present invention is capable of spinning and melt molding at a temperature below 340° C. and provides molded articles having good heat resistance and mechanical strength and also provides filaments having a high tensile modulus.

The aromatic polyester of the present invention can be made by melt spinning into filaments which can be used, as such or after heat treatment, for plastics reinforcement, concrete reinforcement, rubber reinforcement, high-strength rope, and bulletproof jacket.

The aromatic polyester of the present invention is capable of ordinary melt molding such as injection molding, extrusion molding, compression molding, and blow molding. The molded articles find use as connectors, IC sockets, sealant (for IC and transistor), film, covering material and reinforcement (for optical fiber parts), and automotive parts.

The aromatic polyester amide of the present invention has a lower degree of anisotropy in mechanical strength in addition to the same characteristic properties as those of the above-mentioned aromatic polyester. It provides filaments and molded articles which will find use in the same application areas as mentioned above.

Moreover, the present invention provides an inorganic filler-containing aromatic polyester composition and an inorganic filler-containing aromatic polyester amide composition, both having outstanding heat resistance, mechanical strength, moldability, and surface scratch resistance, and directionally balanced mechanical properties owing to the reduced anisotropy. The present invention also provides a magnetic powder-containing polyester composition and a magnetic powder-containing polyester amide composition, both having high mechanical strength, high heat resistance, and good moldability. These compositions will find use in a variety of application areas.

TABLE 1

| | Composition (mol %) | | | | | Melting temperature (°C.) | Vicat softening point (°C.) | Spinning temperature (°C.) | Properties of filaments | | | | Properties of injection-molded articles | |
| --- | --- | --- | --- | --- | --- | --- | --- | --- | --- | --- | --- | --- | --- | --- |
| | | | | | | | | | Filaments as spun | | Filaments after heat treatment | | Izod impact strength (kgcm/cm) | Wet heat stability (%) |
| | I | II | III | IV | V | | | | Tensile strength (g/d) | Tensile modulus (GPa) | Tensile strength (g/d) | Tensile modulus (GPa) | | |
| Example 1 | 60 | 15 | 5 | 17 | 3 | 305 | 236 | 335 | 11.6 | 77.9 | 18.0 | 95.6 | 42.3 | 82 |
| Example 2 | 50 | 18.75 | 6.25 | 21.25 | 3.75 | 278 | 229 | 310 | 10.3 | 82.3 | 16.2 | 100.5 | 39.8 | 76 |
| Example 3 | 70 | 10.25 | 4.75 | 12.75 | 2.25 | 331 | 280 | 340 | 10.5 | 73.8 | 13.2 | 85.0 | 37.6 | 80 |
| Comparative example 1 | 30 | 26.25 | 8.75 | 29.75 | 5.25 | 254 | 195 | 290 | 4.3 | 51.6 | 5.6 | 61.3 | 18.2 | 31 |
| Example 4 | 60 | 10 | 10 | 17 | 3 | 268 | 215 | 290 | 11.2 | 72.9 | 16.0 | 92.0 | 43.4 | 78 |
| Example 5 | 60 | 7 | 13 | 17 | 3 | 280 | 218 | 300 | 9.8 | 62.3 | 15.4 | 82.2 | 38.7 | 81 |
| Example 6 | 60 | 5 | 15 | 17 | 3 | 281 | 215 | 310 | 12.3 | 77.3 | 16.1 | 90.2 | 36.7 | 82 |
| Example 7 | 60 | 3 | 17 | 17 | 3 | 312 | 253 | 340 | 7.2 | 83.2 | 9.2 | 102.0 | 32.8 | 72 |
| Comparative example 2 | 60 | 20 | — | 17 | 3 | 349 | 175 | 370 | 7.3 | 80.2 | 9.0 | 81.8 | 26.5 | 56 |
| Comparative example 3 | 60 | — | 20 | 17 | 3 | 348 | 275 | 370 | 4.2 | 87.3 | 4.8 | 92.0 | 28.3 | 56 |
| Example 8 | 60 | 15 | 5 | 14 | 6 | 281 | 215 | 310 | 13.2 | 76.2 | 16.1 | 90.2 | 37.5 | 83.1 |
| Example 9 | 60 | 15 | 5 | 10 | 10 | 291 | 228 | 320 | 11.2 | 77.2 | 16.2 | 90.0 | 36.8 | 78.2 |
| Example 10 | 60 | 15 | 5 | 6 | 14 | 310 | 254 | 330 | 9.7 | 68.7 | 14.3 | 89.8 | 32.4 | 76.8 |
| Comparative example 4 | 60 | 15 | 5 | 20 | — | 347 | 256 | 370 | 4.8 | 56.4 | 6.6 | 64.2 | 29.4 | 54.3 |
| Comparative ative | 60 | 15 | 5 | — | 20 | 347 | 280 | 370 | 6.8 | 70.2 | 8.3 | 87.3 | 18.9 | 66.3 |

TABLE 1-continued example 5

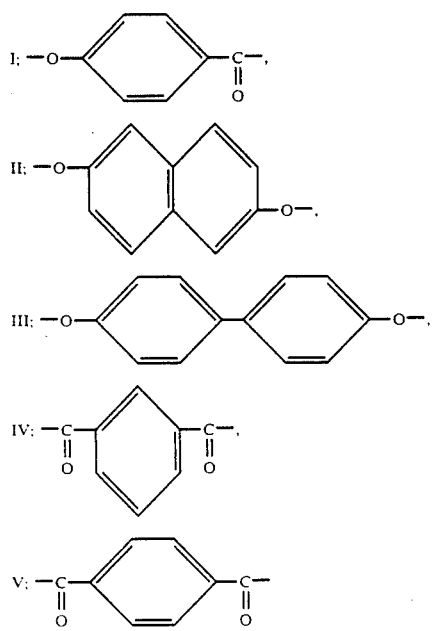

Heat treatment conditions: 100° C. 3 hours ⟶ 260° C. 6 hours ⟶ 280° C. 3 hours
*Retention of impact strength after immersion in hot water (96° C.) for 100 hours (%)

TABLE 2

|  | Composition (mol %) | | | | | Melting temperature (°C.) | Vicat softening point (°C.) | Properties of filaments | | | | | Properties of injection-molded articles | |
|---|---|---|---|---|---|---|---|---|---|---|---|---|---|---|
|  | | | | | | | | Spinning temperature (°C.) | Filaments as spun | | Filaments after heat treatment | | Izod impact strength (kgcm/cm) | Wet heat stability (%) |
|  | I | II | III | IV | V | | | | Tensile strength (g/d) | Tensile modulus (GPa) | Tensile strength (g/d) | Tensile modulus (GPa) | | |
| Example 11 | 60 | 15 | 5 | 17 | 3 | 240 | 162 | 270 | 6.3 | 67.2 | 8.0 | 78.9 | 29.4 | 82.3 |
| Example 12 | 60 | 10 | 10 | 17 | 3 | 254 | 190 | 280 | 7.6 | 72.6 | 10.0 | 114.1 | 27.3 | 76.4 |
| Example 13 | 60 | 7 | 13 | 17 | 3 | 279 | 194 | 305 | 11.2 | 62.8 | 15.4 | 95.2 | 36.1 | 83.7 |
| Example 14 | 60 | 5 | 15 | 17 | 3 | 292 | 218 | 320 | 6.8 | 72.8 | 9.0 | 106.0 | 25.7 | 79.8 |
| Example 15 | 60 | 3 | 17 | 17 | 3 | 307 | 235 | 340 | 7.2 | 71.6 | 8.6 | 89.0 | 26.8 | 77.9 |
| Comparative example 6 | 60 | 20 | — | 17 | 3 | 275 | 202 | 310 | 2.2 | 70.2 | 3.0 | 84.0 | 18.2 | 24.5 |
| Comparative example 7 | 60 | 1 | 19 | 17 | 3 | 337 | 250 | 370 | 4.6 | 56.1 | 5.6 | 65.2 | 17.6 | 38.2 |
| Comparative example 8 | 60 | — | 20 | 17 | 3 | 350 | 180 | 380 | 3.6 | 57.3 | 4.0 | 73.1 | 18.2 | 39.4 |
| Comparative example 10 | Polyester disclosed in Japanese Patent(1) Laid-open No. 84821/1983 | | | | | 290 | 207 | 310 | 7.2 | 52.1 | 11.3 | 53.6 | 24.5 | 21.2 |
| Comparative example 11 | Polyester disclosed in Japanese Patent(2) Laid-open No. 5094/1979 | | | | | 342 | 245 | 360 | 11.3 | 63.2 | 15.4 | 64.8 | 32.1 | 58.3 |
| Comparative example 12 | Polyester disclosed in Japanese Patent(3) Laid-open No. 62630/1984 | | | | | 363 | 252 | 370 | 12.6 | 82.5 | 20.5 | 102.3 | 36.2 | 72.1 |
| Comparative example 13 | Polyester disclosed in Japanese Patent Laid-open No. | | | | | 287 | 201 | 315 | 9.8 | 65.0 | 12.1 | 72.0 | 19.2 | 63.2 |

TABLE 2-continued

284221/1988(U.S. Pat. No. 4,851,497)

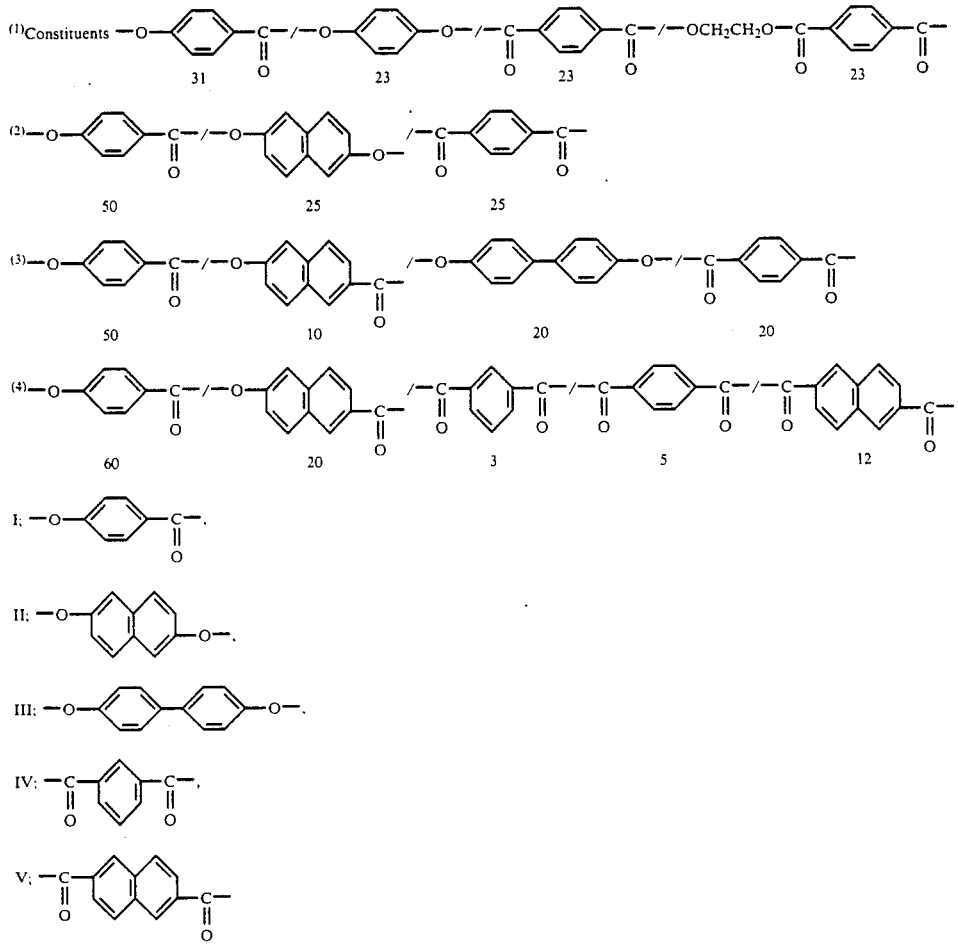

Heat treatment conditions: 100° C. 3 hours, 260° C. 6 hours, 280° C. 3 hours

TABLE 3

| | Composition (mol %) | | | | | | Melting temperature (°C.) | Vicat softening point (°C.) | Spinning temperature (°C.) | Properties of filaments | | | |
|---|---|---|---|---|---|---|---|---|---|---|---|---|---|
| | | | | | | | | | | Filaments as spun | | Filaments after heat treatment | |
| | | | | | | | | | | Tensile strength (g/d) | Tensile modulus (GPa) | Tensile strength (g/d) | Tensile modulus (GPa) |
| | I | II | III | IV | V | VI | | | | | | | |
| Example 16 | 58 | 15 | 5 | 17 | 3 | 2 | 310 | 233 | 335 | 10.7 | 80.5 | 17.2 | 87.7 |
| Comparative example 14 | 18 | 30 | 10 | 34 | 6 | 2 | 240 | 180 | 300 | 4.3 | 69.2 | 7.4 | 76.8 |
| Example 17 | 58 | 10 | 10 | 17 | 3 | 2 | 263 | 220 | 310 | 11.5 | 72.6 | 14.8 | 84.3 |
| Comparative example 15 | 58 | 20 | — | 17 | 3 | 2 | 352 | 263 | 370 | 5.2 | 68.3 | 10.2 | 81.0 |
| Comparative example 16 | 58 | — | 20 | 17 | 3 | 2 | 349 | 253 | 360 | 4.9 | 72.1 | 9.2 | 79.8 |
| Example 18 | 58 | 15 | 5 | 15 | 5 | 2 | 307 | 230 | 335 | 12.1 | 79.2 | 16.8 | 86.3 |
| Comparative example 17 | 58 | 15 | 5 | — | 10 | 2 | 335 | 240 | 360 | 7.1 | 73.8 | 12.5 | 79.1 |
| Comparative | 58 | 15 | 5 | 10 | — | 2 | 334 | 241 | 360 | 5.3 | 61.9 | 13.1 | 74.5 |

TABLE 3-continued
example 18
I; 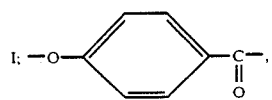
II; 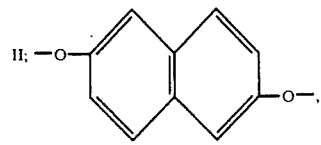
III; 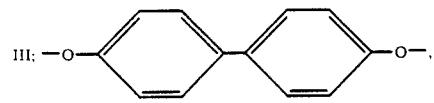
IV; 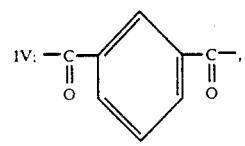
V; 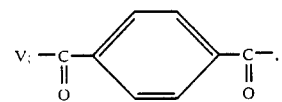
VI; 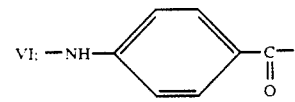
Heat treatment conditions: 100° C. 3 hours ⟶ 260° C. 6 hours ⟶ 280° C. 3 hours

TABLE 4

| | Composition (mol %) | | | | | | Melting temperature (°C.) | Vicat softening point (°C.) | Properties of injection-molded articles | | |
| | I | II | III | IV | V | VI | | | Izod impact strength (kgcm/cm) | Flexural strength (kg/mm²) | MD/TD |
|---|---|---|---|---|---|---|---|---|---|---|---|
| Example 1* | 60 | 15 | 5 | 17 | 3 | — | 305 | 236 | 42.3 | 13.8 | 2.4 |
| Example 19 | 59.5 | 15 | 5 | 17 | 3 | 0.5[5] | 307 | 233 | 36.5 | 14.8 | 2.2 |
| Example 20 | 59 | 15 | 5 | 17 | 3 | 1[5] | 310 | 234 | 43.3 | 14.9 | 2.0 |
| Example 16* | 58 | 15 | 5 | 17 | 3 | 2[5] | 310 | 230 | 40.0 | 14.2 | 2.0 |
| Example 21 | 56 | 15 | 5 | 17 | 3 | 4[5] | 315 | 224 | 34.8 | 13.7 | 2.0 |
| Example 22 | 54 | 15 | 5 | 17 | 3 | 6[5] | 320 | 223 | 33.0 | 13.3 | 1.9 |
| Example 23 | 50 | 15 | 5 | 17 | 3 | 10[5] | 323 | 214 | 23.3 | 12.7 | 1.9 |
| Example 24 | 60 | 9.75 | 9.75 | 17 | 3 | 0.5[6] | 311 | 235 | 33.3 | 14.5 | 2.1 |
| Example 25 | 60 | 9.5 | 9.5 | 17 | 3 | 1[6] | 312 | 231 | 39.5 | 14.3 | 1.9 |
| Example 26 | 60 | 9 | 9 | 17 | 3 | 2[6] | 312 | 227 | 30.0 | 13.7 | 1.9 |
| Example 27 | 60 | 8 | 8 | 17 | 3 | 4[6] | 317 | 227 | 26.0 | 13.2 | 2.0 |
| Example 28 | 60 | 7 | 7 | 17 | 3 | 6[6] | 325 | 227 | 20.8 | 12.6 | 1.9 |
| Comparative example 19 | 48 | 15 | 5 | 17 | 3 | 12[5] | 330 | 205 | 17.0 | 11.7 | 2.0 |
| Comparative example 20[7] | 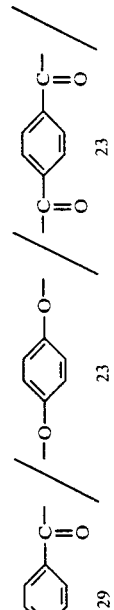 29 |  | 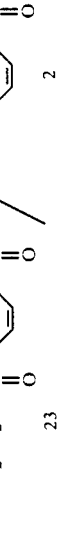 23 | | | | 307 | 205 | 23.8 | 11.8 | 2.2 |
| Comparative example 10 (Reference) |  31 |  |  23 | |  2 | | 290 | 207 | 24.5 | 12.1 | 2.4 |
| Comparative example 21[8] |  48 |  |  |  23 | | | 355 | 238 | 30.5 | 11.9 | 2.2 |

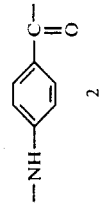

TABLE 4-continued

| | Composition (mol %) | | | | | | Melting temperature (°C.) | Vicat softening point (°C.) | Properties of injection-molded articles | | |
|---|---|---|---|---|---|---|---|---|---|---|---|
| | | | | | | | | | Izod impact strength (kgcm/cm) | Flexural strength (kg/mm²) | MD/TD |
| I | II | III | IV | V | VI | | | | | | |
| / | / | / | / | / | —C⟨⟩C—<br>‖ ‖<br>O O<br>20 | | | | | | |

I: —C⟨⟩O—
    ‖
    O

II: —O⟨⟩⟨⟩O—

III: —O⟨⟩—⟨⟩O—

IV: —C⟨⟩C—
     ‖   ‖
     O   O

V: —C⟨⟩C—
    ‖   ‖
    O   O

VI: —NH⟨⟩N—

⁵Z: —C—O—
         ‖
         O

⁶Z: —O—

*reference
⁷Prepared by introducing an amide linkage into the polyester disclosed in Japanese Patent Laid-open No.84821/1983
⁸Prepared by introducing an amide linkage into the polyester disclosed in Japanese Patent Laid-open No.5094/1979
⁹Prepared by introducing an amide linkage into the polyester disclosed in Japanese Patent Laid-open No.62630/1984

TABLE 5

| | Composition of copolymer resin | Composition (%) Resin | Composition (%) Inorganic filler* | Anisotropism Strength (in MD) | Anisotropism Strength (in MD) | Anisotropism MD/TD | Modulus (in MD) | Heat distortion temperature (°C.) | Injection molding temperature (°C.) | Surface scratch resistance |
|---|---|---|---|---|---|---|---|---|---|---|
| Example 29 | (a) | 70 | 30 | 2200 | 1250 | 1.8 | 145,000 | 251 | 320 | ○ |
| Example 30 | (b) | 70 | 30 | 2050 | 1150 | 1.8 | 130,000 | 247 | 320 | ○ |
| Example 31 | (c) | 70 | 30 | 2100 | 1200 | 1.8 | 135,000 | 241 | 315 | ○ |
| Example 32 | (d) | 70 | 30 | 1950 | 1050 | 1.9 | 120,000 | 242 | 315 | ○ |
| Example 33 | (e) | 70 | 30 | 2100 | 1300 | 1.6 | 135,000 | 247 | 320 | ○ |
| Example 34 | (f) | 70 | 30 | 2150 | 1400 | 1.5 | 130,000 | 245 | 315 | ○ |
| Comparative example 23 | (g) | 70 | 30 | 1100 | 580 | 1.9 | 130,000 | 190 | 300 | ○ |
| Comparative example 24 | (h) | 70 | 30 | 1900 | 1000 | 1.9 | 12,000 | 240 | 320 | ○ |
| Comparative example 25 | (i) | 70 | 30 | 2050 | 1080 | 1.9 | 14,000 | 276 | 355 | ○ |
| Example 1 (Reference) | (a) | 100 | — | 1500 | 625 | 2.4 | 84,000 | 217 | 290 | x |
| Example 16 (Reference) | (e) | 100 | — | 1400 | 700 | 2.0 | 81,000 | 207 | 280 | x |
| Example 35 | (a) | 60 | 40 | 1750 | 1030 | 1.7 | 160,000 | 280 | 340 | ○ |
| Example 36 | (a) | 80 | 20 | 1450 | 770 | 1.9 | 130,000 | 242 | 310 | ○ |
| Example 37 | (a) | 30 | 70 | 1550 | 970 | 1.6 | 170,000 | 300 | 360 | ○ |
| Example 38 | (b) | 60 | 40 | 1600 | 940 | 1.7 | 140,000 | 273 | 330 | ○ |
| Example 39 | (b) | 40 | 60 | 1480 | 870 | 1.7 | 155,000 | 285 | 345 | ○ |
| Example 40 | (e) | 60 | 40 | 2100 | 1400 | 1.5 | 140,000 | 255 | 315 | ○ |
| Example 41 | (e) | 40 | 60 | 2100 | 1400 | 1.5 | 165,000 | 295 | 345 | ○ |
| Comparative example 26 | (g) | 60 | 40 | 1300 | 720 | 1.8 | 135,000 | 240 | 300 | ○ |
| Comparative example 27 | (g) | 40 | 60 | 1500 | 880 | 1.7 | 145,000 | 265 | 325 | ○ |
| Comparative example 28 | (h) | 60 | 40 | 2000 | 1100 | 1.8 | 130,000 | 260 | 365 | ○ |
| Comparative example 29 | (h) | 40 | 60 | 1950 | 1150 | 1.7 | 140,000 | 275 | 380 | ○ |

*Glass fiber (11 μm in average diameter and 3 mm long)

TABLE 6

| | Composition of copolymer resin | Inorganic filler | Composition (%) Resin | Composition (%) Inorganic filler | Anisotropism Strength (in MD) | Anisotropism Strength (in TD) | Anisotropism MD/TD | Modulus (in MD) | Heat distortion temperature (°C.) | Injection molding temperature (°C.) | Surface scratch resistance |
|---|---|---|---|---|---|---|---|---|---|---|---|
| Example 42 | (a) | wollastonite | 70 | 30 | 1650 | 920 | 1.8 | 130,000 | 248 | 320 | ○ |
| Example 43 | (a) | wollastonite | 50 | 50 | 1400 | 820 | 1.7 | 145,000 | 260 | 330 | ○ |
| Example 44 | (e) | wollastonite | 70 | 30 | 1600 | 1000 | 1.6 | 135,000 | 236 | 315 | ○ |
| Example 45 | (e) | wollastonite | 50 | 50 | 1420 | 910 | 1.6 | 140,000 | 252 | 330 | ○ |
| Example 46 | (a) | talc | 70 | 30 | 1700 | 940 | 1.8 | 130,000 | 245 | 320 | ○ |
| Example 47 | (a) | talc | 50 | 50 | 1500 | 830 | 1.8 | 145,000 | 261 | 330 | ○ |
| Example 48 | (e) | talc | 70 | 30 | 1650 | 970 | 1.7 | 130,000 | 239 | 315 | ○ |
| Example 49 | (e) | talc | 50 | 50 | 1450 | 910 | 1.6 | 140,000 | 246 | 320 | ○ |
| Example 1 (Reference) | (a) | — | 100 | — | 1500 | 625 | 2.4 | 84,000 | 217 | 290 | x |
| Example 16 (Reference) | (e) | — | 100 | — | 1400 | 700 | 2.0 | 81,000 | 207 | 280 | x |

TABLE 7

| | Composition of copolymer resin | Composition (%) Resin | Composition (%) Ferrite | Anisotropism Br (G) | Anisotropism Hc (Oe) | (BH) max (MGOe) | Flexural strength (kg/cm$^2$) | Injection molding temperature (°C.) | Heat distortion temperature (°C.) |
|---|---|---|---|---|---|---|---|---|---|
| Example 50 | (a) | 10 | 90 | 2050 | 2000 | 1.2 | 1060 | 305 | 230 |
| Example 51 | (b) | 10 | 90 | 2050 | 2000 | 1.2 | 1030 | 305 | 232 |
| Example 52 | (c) | 10 | 90 | 2050 | 2000 | 1.2 | 1050 | 310 | 241 |
| Example 53 | (d) | 10 | 90 | 2050 | 2000 | 1.2 | 1070 | 310 | 232 |
| Example 54 | (e) | 10 | 90 | 2050 | 2000 | 1.2 | 1030 | 310 | 229 |
| Example 55 | (f) | 10 | 90 | 2050 | 2000 | 1.2 | 1040 | 305 | 231 |
| Comparative[7] Example 30 | (g) | 10 | 90 | 2050 | 2000 | 1.2 | 900 | 300 | 190 |
| Comparative[8] Example 31 | (h) | 10 | 90 | 2050 | 2000 | 1.2 | 950 | 370 | 223 |
| Comparative[10] Example 32 | (i) | 10 | 90 | 2050 | 2000 | 1.2 | 980 | 340 | 240 |
| Comparative Example 33 | nylon-6 | 10 | 90 | 2050 | 2000 | 1.2 | 500 | 290 | 150 |
| Example 56 | (a) | 15 | 85 | 1940 | 1890 | 1.1 | 1020 | 300 | 225 |
| Example 57 | (a) | 20 | 80 | 1820 | 1780 | 1.0 | 980 | 295 | 218 |

TABLE 7-continued

| | Composition of copolymer resin | Composition (%) Resin | Composition (%) Ferrite | Anisotropism Br (G) | Anisotropism Hc (Oe) | Anisotropism (BH) max (MGOe) | Flexural strength (kg/cm²) | Injection molding temperature (°C.) | Heat distortion temperature (°C.) |
|---|---|---|---|---|---|---|---|---|---|
| Example 58 | (b) | 15 | 85 | 1940 | 1890 | 1.1 | 1010 | 300 | 232 |
| Example 59 | (b) | 20 | 80 | 1820 | 1780 | 1.0 | 980 | 295 | 219 |
| Example 60 | (e) | 15 | 85 | 1940 | 1890 | 1.1 | 1010 | 305 | 225 |
| Example 61 | (e) | 20 | 80 | 1820 | 1780 | 1.0 | 970 | 300 | 215 |

For [7,8] and [10], refer to notes on the margin of Table 4-4.

TABLE 8

Constituents and composition (mol %)

Present Invention  Aromatic polyester (a) 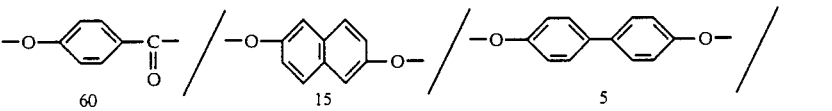

(b) 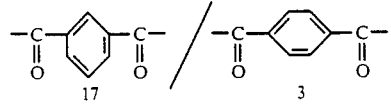

(c) 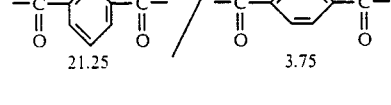

(d) 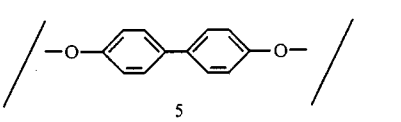

Present Invention  Aromatic Polyester amide (e) 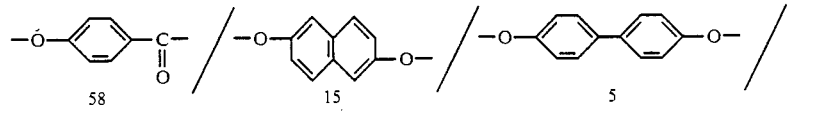

TABLE 8-continued

Constituents and composition (mol %)

(f) 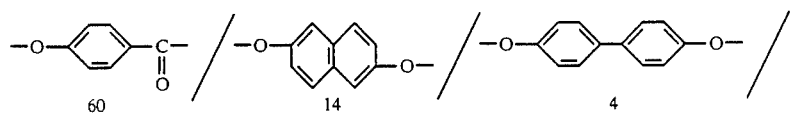

Comparative Example (g) 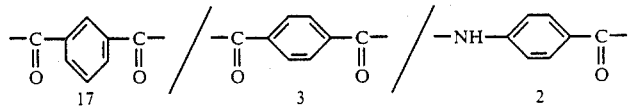

(h) 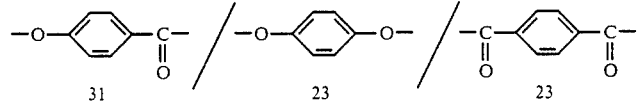

(i) 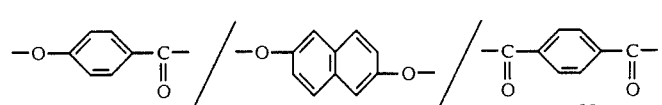

Note
(g) Cited from Japanese Patent Laid-open No.84821/1983
(h) Cited from Japanese Patent Laid-open No.5094/1979
(i) Cited from Japanese Patent Laid-open No.62630/1984

We claim:
1. An aromatic polyester comprising the units:

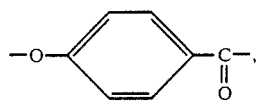 (I)

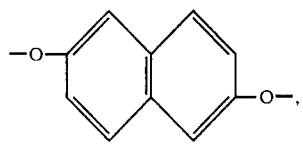 (II)

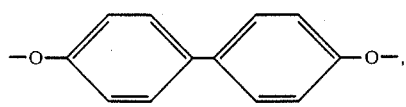 (III)

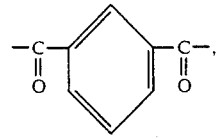 (IV)

and

 (V)

wherein Ar is selected from p-phenylene and 2,6-naphthalene groups, provided that hydrogen atoms on aromatic rings of untis (I) to (V) may be partly substituted by at least one member selected from $C_1$-$C_4$ alkyl groups, $C_1$-$C_4$ alkoxy groups, $C_6$-$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole percent, and 2,6-naphthalene groups in unit (V) comprise up to 5 mole percent of the total of units (I) to (V) when Ar in unit (V) is a 2,6-naphthalene group; and wherein a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

2. An aromatic polyester amide comprising the units:

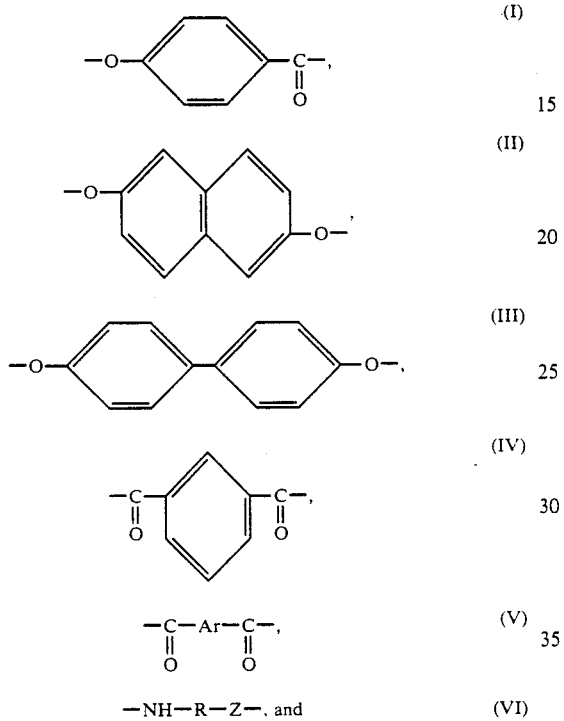

wherein Ar is selected fom p-phenylene and 2,6-naphthalene groups, R is selected from p-phenylene and m-phenylene groups, and Z is selected from —NH—, —O—, and

provided that hydrogen atoms on aromatic rings of units (I) to (VI) may be partly substituted by at least one member selected from $C_1$-$C_4$ alkyl groups, $C_1$-$C_4$ alkoxy groups, $C_6$-$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole percent, 2,6-naphthalene groups in unit (V) comprise up to 5 mole percent when Ar in unit (V) is a 2,6-naphthalene group, and unit (VI) comprises 0.1 to 10 mole percent of the total of units (I) to (V); and when Z is selected from —NH— and —O—, a molar ratio of [unit (II)+unit (III)+unit (VI)] to [unit (IV)+unit (V)] is 1:0.9 to 1:1.1, a molar ratio of unit (III) to [unit (II)+unit (III)+unit (VI)] is from 0.15 to 0.85, and a molar ratio of unit (V) to [unit (IV)+unit (V)] is from 0.10 to 0.90, and when Z is $$-\overset{\text{O}}{\underset{\|}{C}}-,$$

a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

3. An aromatic polyester filament comprising an aromatic polyester comprising the units:

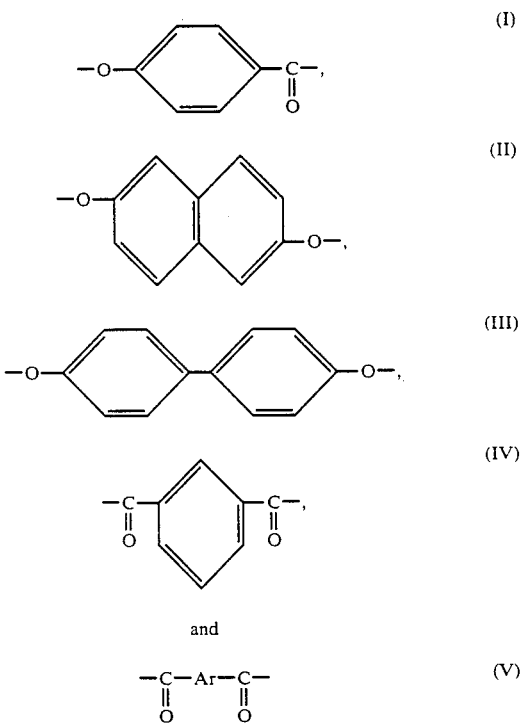

and

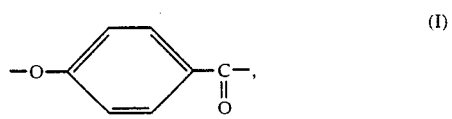

wherein Ar is selected from p-phenylene and 2,6-naphthalene groups, provided that hydrogen atoms on aromatic rings of untis (I) to (V) may be partly substituted by at least one member selected from $C_1$-$C_4$ alkyl groups, $C_1$-$C_4$ alkoxy groups, $C_6$-$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole pecent, and 2,6-naphthalene groups in unit (V) comprise up to 5 mole percent of the total of units (I) to (V) when Ar in unit (V) is a 2,6-naphthalene group; and wherein a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

4. An aromatic polyester amide filament comprising an aromatic polyester amide comprising the units:

(I)

—O—⟨phenylene⟩—C(=O)—,

-continued $$-O-\underset{}{\underset{}{\bigcirc\!\!\!\bigcirc}}-O-, \quad (II)$$

$$-O-\underset{}{\bigcirc}-\underset{}{\bigcirc}-O-, \quad (III)$$

$$-\underset{O}{\overset{}{\underset{\|}{C}}}-\underset{}{\bigcirc}-\underset{O}{\overset{}{\underset{\|}{C}}}-, \quad (IV)$$

$$-\underset{O}{\overset{}{\underset{\|}{C}}}-Ar-\underset{O}{\overset{}{\underset{\|}{C}}}-, \quad (V)$$

$$-NH-R-Z-, \text{ and} \quad (VI)$$

wherein Ar is selected from p-phenylene and 2,6-naphthalene groups, R is selected from p-phenylene and m-phenylene groups, and Z is selected from —NH—, —O—, and $$-\underset{O}{\overset{}{\underset{\|}{C}}}-,$$

provided that hydrogen atoms on aromatic rings of units (I) to (VI) may be partly substituted by at least one member selected from $C_1$-$C_4$ alkyl groups, $C_1$-$C_4$ alkoxy groups, $C_6$-$C_{10}$ aryl groups, and halogen atoms; and wherein unit (I) comprise 40 to 70 mole percent, unit (II)+unit (III) comprise 15 to 30 mole percent, unit (IV)+unit (V) comprise 15 to 30 mole percent, unit (IV) comprises 5 to 25 mole percent, 2,6-naphthalene groups in unit (V) comprise up to 5 mole percent when Ar in unit (V) is a 2,6-naphthalene group, and unit (VI) comprises 0.1 to 10 mole percent of the total of units (I) to (V); and when Z is selected from —NH— and —O—, a molar ratio of [unit (II)+unit (III)+unit (III)+unit (VI)] to [unit (IV)+unit (V)] is 1:0.9 to 1:1.1, a molar ratio of unit (III) to [unit (II)+unit (III)+unit (VI)] is from 0.15 to 0.85, and a molar ratio of unit (V) to [unit (IV)+unit (V)] is from 0.10 to 0.90, and when Z is $$-O-\underset{}{\bigcirc}-\underset{O}{\overset{}{\underset{\|}{C}}}-, \quad (I)$$

$$-O-\underset{}{\underset{}{\bigcirc\!\!\!\bigcirc}}-O-, \quad (II)$$

-continued $$-O-\underset{}{\bigcirc}-\underset{}{\bigcirc}-O-, \quad (III)$$

$$-\underset{O}{\overset{}{\underset{\|}{C}}}-\underset{}{\bigcirc}-\underset{O}{\overset{}{\underset{\|}{C}}}-, \quad (IV)$$

and $$-\underset{O}{\overset{}{\underset{\|}{C}}}-Ar-\underset{O}{\overset{}{\underset{\|}{C}}}- \quad (V)$$

a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

5. An inorganic filler-containing aromatic polyester composition, the amount of inorganic filler being 1–400 parts by weight for 100 parts by weight of aromatic polyester, said aromatic polyester comprising the units:

$$-O-\underset{}{\bigcirc}-\underset{O}{\overset{}{\underset{\|}{C}}}-, \quad (I)$$

$$-O-\underset{}{\underset{}{\bigcirc\!\!\!\bigcirc}}-O-, \quad (II)$$

$$-O-\underset{}{\bigcirc}-\underset{}{\bigcirc}-O-, \quad (III)$$

$$-\underset{O}{\overset{}{\underset{\|}{C}}}-\underset{}{\bigcirc}-\underset{O}{\overset{}{\underset{\|}{C}}}-, \quad (IV)$$

and $$-\underset{O}{\overset{}{\underset{\|}{C}}}-Ar-\underset{O}{\overset{}{\underset{\|}{C}}}- \quad (V)$$

wherein Ar is selected from p-phenylene and 2,6-naphthalene groups, provided that hydrogen atoms on aromatic rings of units (I) to (V) may be partly substituted by at least one member selected from $C_1$-$C_4$ alkyl groups, $C_1$-$C_4$ alkoxy groups, $C_6$-$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole percent, and 2,6-naphthalene groups in unit (V) comprise up to 5 mole percent of the total of units (I) to (V) when Ar in unit (V) is a 2,6-naphthalene group; and wherein a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

6. An inorganic filler-containing aromatic polyester amide composition, the amount of inorganic filler being 1–400 parts by weight for 100 parts by weight of aromatic polyester amide, said aromatic polyester amide comprising the units:

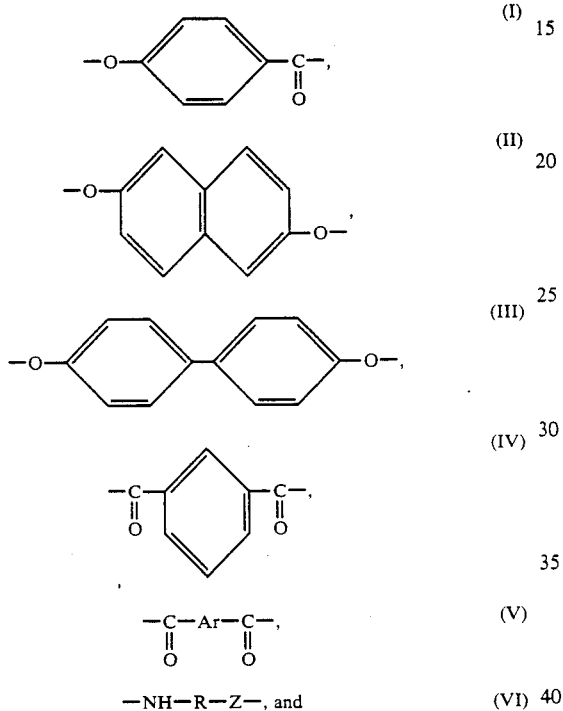

—NH—R—Z—, and  (VI)

wherein Ar is selected from p-phenylene and 2,6-naphthalene groups, R is selected from p-phenylene and m-phenylene groups, and Z is selected from —NH—, —O—, and

provided that hydrogen atoms on aromatic rings of units (I) to (VI) may be partly substituted by at least one member selected from $C_1$–$C_4$ alkyl groups, $C_1$–$C_4$ alkoxy groups, $C_6$–$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole percent, 2,6-naphthalene groups in unit (V) comprise up to 5 mole percent when Ar in unit (V) is a 2,6-naphthalene group, and unit (VI) comprises 0.1 to 10 mole percent of the total of units (I) to (V); and when Z is selected from —NH— and —O—, a molar ratio of [unit (II)+unit (III)+unit (VI)] to [unit (IV)+unit (V)] is 1:0.9 to 1:1.1, a molar ratio of unit (III) to [unit (II)+unit (III)+unit (VI)] is from 0.15 to 0.85, and a molar ratio of unit (V) to [unit (IV)+unit (V)] is from 0.10 to 0.90, and when Z is

a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

7. A magnetic powder-containing aromatic polyester composition, the amount of magnetic powder being 100–1900 parts by weight for 100 parts by weight of aromatic polyester, said aromatic polyester comprising the units:

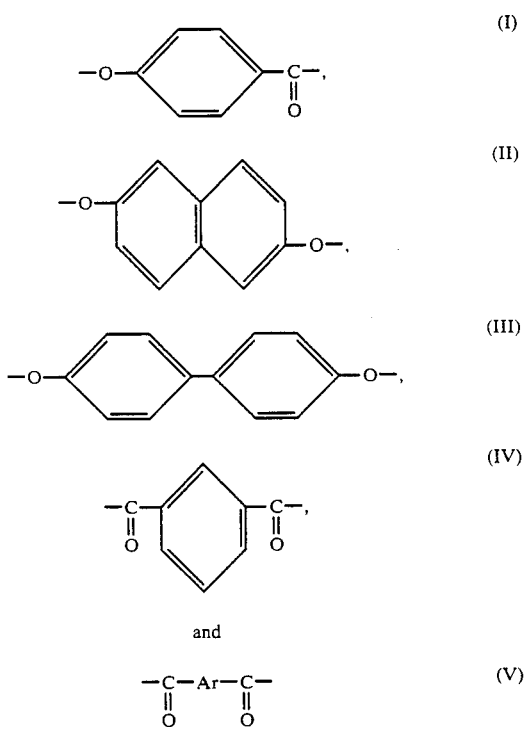

wherein Ar is selected from p-phenylene and 2,6-naphthalene groups, provided that hydrogen atoms on aromatic rings of units (I) to (V) may be partly substituted by at least one member selected from $C_1$–$C_4$ alkyl groups, $C_1$–$C_4$ alkoxy groups, $C_6$–$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole percent, and 2,6-naphthalene groups in unit (V) comprise up to 5 mole percent of the total of units (I) to (V) when Ar in unit (V) is a 2,6-naphthalene group; and wherein a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (V)] is from 0.10 to 0.90.

8. A magnetic powder-containing aromatic polyester amide composition, the amount of magnetic powder being 100–1900 parts by weight for 100 parts by weight of aromatic polyester amide, said aromatic polyester amide comprising the units:

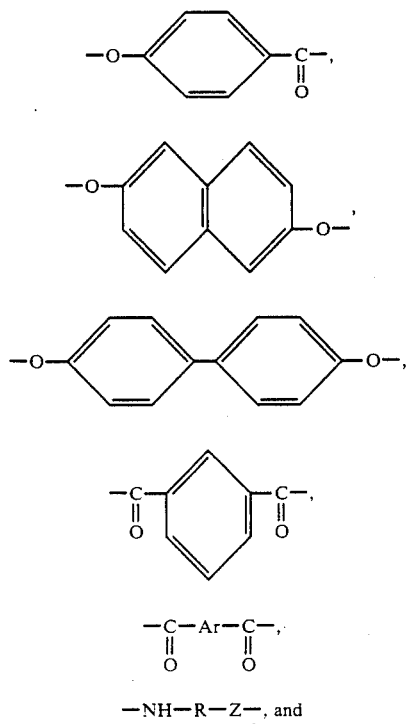

(I)

(II)

(III)

(IV)

(V)

—NH—R—Z—, and (VI)

wherein Ar is selected from p-phenylene and 2,6-naphthalene groups, R is selected from p-phenylene and m-phenylene groups, and Z is selected frm —NH—, —O—, and

provided that hydrogen atoms on aromatic rings of units (I) to (VI) may be partly substituted by at least one member selected from $C_1$-$C_4$ alkyl groups, $C_1$-$C_4$ alkoxy groups, $C_6$-$C_{10}$ aryl groups, and halogen atoms; and wherein unit (I) comprises 40 to 70 mole percent, unit (II)+unit (III) comprise 15 to 30 mole percent, unit (IV)+unit (V) comprise 15 to 30 mole percent, unit (IV) comprises 5 to 25 mole percent, 2,6-naphthalene groups in unit (V) comprise up to 5 mole percent when Ar in unit (V) is a 2,6-naphthalene group, and unit (VI) comprises 0.1 to 10 mole percent of the total of units (I) to (V); and when Z is selected frm —NH— and —O—, a molar ratio of [unit (II)+unit (III)+unit (VI)] to [unit (IV)+unit (V)] is 1:0.9 to 1:1.1, a molar ratio of unit (III) to [unit (II)+unit (III)+unit (VI)] is from 0.15 to 0.85, and a molar ratio of unit (V) to [unit (IV)+unit (V)] is from 0.10 to 0.90, and when Z is

a molar ratio of [unit (II)+unit (III)] to [unit (IV)+unit (V)] is 1:0.9 to 1:1.1, a molar ratio of unit (III) to [unit (II)+unit (III)] is from 0.15 to 0.85, and a molar ratio of unit (V) to [unit (IV)+unit (IV)] is from 0.10 to 0.90.

* * * * *

UNITED STATES PATENT AND TRADEMARK OFFICE
CERTIFICATE OF CORRECTION

PATENT NO. : 5,049,295
DATED : September 17, 1991
INVENTOR(S) : Kazuya TAKEMURA, Tadahiro WAKUI and Kenji YOSHINO It is certified that error appears in the above-identified patent and that said Letters Patent is hereby corrected as shown below:

Column 2, line 46, change "continuouslly" to --continuously--;
    line 54, change "can not" to --cannot-- and change "regid" to --rigid--;
    line 66, change "TD])" to --[TD])--.

Column 3, line 5, change "anistropy" to --anisotropy--.

Column 6, line 7, change "is from" to --of--.

Column 8, line 53, delete "a".

Column 9, line 18, change "grapsh" to --graphs--.

Column 11, line 9, change "has" to --have--.

Column 12, line 41, change "modulous" to --modulus--.

Column 15, line 28, between "molding" and "blow" insert --,--.

Column 19, line 44, change "Measured" to --measured--;
    line 47, change "Measured" to --measured--;
    line 49, change "Measured" to --measured--.

Column 20, line 7, change "measurd" to --measured--.
    line 22, change "criterion" to --criteria--.

Column 22, line 10, change "EXMAPLE" to --EXAMPLE--.

Column 23, line 12, change "ration" to --ratio--;
    line 34, change "EXMAPLES" to --EXAMPLES--;
    line 51, change "EXMAPLE" to --EXAMPLE--;
    line 66, delete "*".

UNITED STATES PATENT AND TRADEMARK OFFICE
CERTIFICATE OF CORRECTION

PATENT NO. : 5,049,295
DATED : September 17, 1991
INVENTOR(S) : Kazuya TAKEMURA, Tadahiro WAKUI and Kenji YOSHINO It is certified that error appears in the above-identified patent and that said Letters Patent is hereby corrected as shown below:

Column 24, line 20, change "ind" to --in--;
      line 44, change "ind" to --in--.

Column 44, line 59, change "untis" to --units--.

Column 47, Formula (V), after the formula insert --and--;
      Formula (VI), line 24, delete "and";
      line 49, delete "+unit(III)";
      line 55, after "is" insert $-\overset{C}{\underset{O}{-|-}},-$;
      delete lines 56-68 in their entirety.

Column 48, delete lines 1-18 in their entirety.

Column 49, line 36, after the equation insert --and--;
      line 40, after the equation, delete "and".

Column 50, line 13, change "powder-contaning" to --powder-containing--;
      line 55, change "(II)" to --(III)--.

Column 51, line 27, after the equation insert --and--;
      line 30, after the equation, delete "and".

UNITED STATES PATENT AND TRADEMARK OFFICE
CERTIFICATE OF CORRECTION

PATENT NO. : 5,049,295
DATED : September 17, 1991
INVENTOR(S) : Kazuya TAKEMURA, Tadahiro WAKUI and Kenji YOSHINO It is certified that error appears in the above-indentified patent and that said Letters Patent is hereby corrected as shown below:

Column 52, line 35, change "(IV)]" to --(V)]--.

Signed and Sealed this

Twelfth Day of October, 1993

Attest:

BRUCE LEHMAN

*Attesting Officer*  *Commissioner of Patents and Trademarks*